US012347912B2

(12) United States Patent
Chen et al.

(10) Patent No.: US 12,347,912 B2
(45) Date of Patent: Jul. 1, 2025

(54) MULTI-LAYERED RESONATOR CIRCUIT STRUCTURE AND MULTI-LAYERED FILTER CIRCUIT STRUCTURE

(71) Applicants: UNIMICRON TECHNOLOGY CORP, Taoyuan (TW); TUNGHAI UNIVERSITY, Taichung (TW)

(72) Inventors: Chi-Feng Chen, Taoyuan (TW); Po-Sheng Yen, Taoyuan (TW); Ruey-Beei Wu, Taoyuan (TW); Ra-Min Tain, Taoyuan (TW); Chin-Sheng Wang, Taoyuan (TW); Jun-Ho Chen, Taoyuan (TW)

(73) Assignees: UNIMICRON TECHNOLOGY CORP, Taoyuan (TW); TUNGHAI UNIVERSITY, Taichung (TW)

( * ) Notice: Subject to any disclaimer, the term of this patent is extended or adjusted under 35 U.S.C. 154(b) by 274 days.

(21) Appl. No.: 18/121,476

(22) Filed: Mar. 14, 2023

(65) Prior Publication Data

US 2023/0420818 A1 Dec. 28, 2023

Related U.S. Application Data

(60) Provisional application No. 63/356,379, filed on Jun. 28, 2022.

(30) Foreign Application Priority Data

Nov. 7, 2022 (TW) ................................ 111142437

(51) Int. Cl.
*H01P 1/203* (2006.01)
*H01P 3/08* (2006.01)

(52) U.S. Cl.
CPC ...... *H01P 1/20309* (2013.01); *H01P 1/20345* (2013.01); *H01P 3/088* (2013.01)

(58) Field of Classification Search
CPC ................. H01P 3/088; H01P 1/20309; H03H 1/20345
(Continued)

(56) References Cited

U.S. PATENT DOCUMENTS 6,768,399 B2 * 7/2004 Uriu .................... H01P 1/20345 333/204
8,988,299 B2 3/2015 Kam et al.

FOREIGN PATENT DOCUMENTS

WO 2010/134858 A1 11/2010

OTHER PUBLICATIONS

Chi-Feng Chen., et al., "Novel Compact Net-Type Resonators and Their Applications to Microstrip Bandpass Filters," IEEE Transactions on Microwave Theory and Techniques , vol. 54, Issue 2, pp. 755-762 (Feb. 6, 2006).

* cited by examiner

*Primary Examiner* — Rakesh B Patel
(74) *Attorney, Agent, or Firm* — Maschoff Brennan

(57) ABSTRACT

A multi-layered resonator circuit structure and a multi-layered filter circuit structure. The multi-layered resonator circuit structure includes a multi-layered substrate, a plurality of resonators and a plurality of conductive components. The multi-layered substrate has a top surface, a bottom surface, and a ground layer. The top surface and the bottom surface face away from each other. The ground layer is located between the top surface and the bottom surface. A part of the plurality of resonators is/are disposed on the top surface. Another part of the plurality of resonators is/are disposed on the bottom surface. The plurality of conductive components is located in the multi-layered substrate. The plurality of resonators is electrically connected to the ground layer, respectively, via the plurality of conductive components.

11 Claims, 29 Drawing Sheets

(58) Field of Classification Search
USPC .................................. 333/202–205, 236–238
See application file for complete search history.

MULTI-LAYERED RESONATOR CIRCUIT STRUCTURE AND MULTI-LAYERED FILTER CIRCUIT STRUCTURE

CROSS-REFERENCE TO RELATED APPLICATIONS

This non-provisional application claims priority under 35 U.S.C. § 119(a) on Patent Application No(s). 111142437 filed in Taiwan, R.O.C. on Nov. 7, 2022, and on provisional patent application No(s). 63/356,379 filed in U.S.A. on Jun. 28, 2022, the entire contents of which are hereby incorporated by reference.

TECHNICAL FIELD

The disclosure relates to a resonator circuit structure and a filter circuit structure, more particularly to a multi-layered resonator circuit structure and a multi-layered filter circuit structure.

BACKGROUND

In general, a band-pass filter is configured to pass frequencies within a certain range and reject frequencies outside that range. Such band-pass filter is usually implemented by one or more resonators since the resonators exhibit a resonance behavior of having better frequency response at some specific frequencies than at other frequencies. Typically, the resonators are disposed on the same mounting surface of the circuit board when implementing the band-pass filter.

However, since the resonators are disposed on the same mounting surface of the circuit board, the total space on the mounting surface available for mounting other electronic components besides the resonators is very limited, which is unfavorable for the space utilization and the miniaturization of the circuit board.

SUMMARY

The disclosure provides a multi-layered resonator circuit structure and a multi-layered filter circuit structure to improve the space utilization of the circuit board (i.e., multi-layered substrate) and facilitate the miniaturization of the circuit board.

One embodiment of this disclosure provides a multi-layered resonator circuit structure including a multi-layered substrate, a plurality of resonators and a plurality of conductive components. The multi-layered substrate has a top surface, a bottom surface, and a ground layer. The top surface and the bottom surface face away from each other. The ground layer is located between the top surface and the bottom surface. A part of the plurality of resonators is/are disposed on the top surface. Another part of the plurality of resonators is/are disposed on the bottom surface. The plurality of conductive components is located in the multi-layered substrate. The plurality of resonators is electrically connected to the ground layer, respectively, via the plurality of conductive components.

In an embodiment of the disclosure, each of the plurality of resonators includes a joint and a plurality of stubs. The plurality of stubs is connected to the joint. The plurality of stubs is one ground stub and at least one open stub. The plurality of ground stubs is electrically connected to the ground layer, respectively, via the plurality of conductive components.

In an embodiment of the disclosure, the at least one open stub includes a plurality of open stubs.

In an embodiment of the disclosure, each of the plurality of stubs includes an inner extension portion and an outer extension portion. The inner extension portion is connected to the joint. The outer extension portion is connected to the inner extension portion. The outer extension portion is non-parallel to the inner extension portion.

In an embodiment of the disclosure, the inner extension portion and the outer extension portion of one of the plurality of stubs and the inner extension portion of another one of the plurality of stubs which is located adjacent thereto together form an arrangement area therebetween. Each of the plurality of resonators further includes a plurality of leaves connected to the joint and located in the plurality of arrangement areas, respectively.

In an embodiment of the disclosure, two of the plurality of resonators are disposed on the top surface and are coupled to each other via two of the plurality of stubs arranged side by side on the top surface. Another two of the plurality of resonators are disposed on the bottom surface and are coupled to each other via another two of the plurality of stubs arranged side by side on the bottom surface. The ground layer has two opening slots spaced apart from each other. One of the two opening slots corresponds to the two of the plurality of stubs coupled to each other on the top surface. Another one of the two opening slots corresponds to the another two of the plurality of stubs coupled to each other on the bottom surface.

In an embodiment of the disclosure, an orthogonal projection of each of the two opening slots onto the top surface or the bottom surface is located between the two joints, and perpendicular to the two outer extension portions of the two stubs coupled to each other.

In an embodiment of the disclosure, each of the two opening slots includes a main slot portion and two secondary slot portions. An orthogonal projection of the main slot portion onto the top surface or the bottom surface is located between the two joints and perpendicular to the two outer extension portions of the two stubs coupled to each other. The two secondary slot portions are perpendicular to the main slot portion and connected to two opposite ends of the main slot portion, respectively.

In an embodiment of the disclosure, each of the two opening slots further includes a plurality of tertiary slot portions parallel to the main slot portion and connected two opposite ends of the two secondary slot portions, respectively.

Another embodiment of this disclosure provides a multi-layered filter circuit structure including a multi-layered substrate having a top surface, a plurality of filters and a plurality of conductive components. The multi-layered substrate has a top surface, a bottom surface, and a ground layer. The top surface and the bottom surface face away from each other. The ground layer is located between the top surface and the bottom surface. A part of the plurality of filters is/are disposed on the top surface, and another part of the plurality of filters is/are disposed on the bottom surface. A plurality of conductive components is located in the multi-layered substrate. The plurality of filters is electrically connected to the ground layer, respectively, via the plurality of conductive components.

In an embodiment of the disclosure, each of the plurality of filters includes at least one resonator, an input port and an output port. The input port and the output port are spaced apart from the at least one resonator and located on two opposite sides of the at least one resonator, respectively. The plurality of resonators is, electrically connected to the ground layer, respectively, via the plurality of conductive components.

In an embodiment of the disclosure, a plurality of resonators is disposed on the top surface and in alignment with a plurality of straight lines, and a plurality of resonators is disposed on the bottom surface and in alignment with a plurality of straight lines.

In an embodiment of the disclosure, on the top surface or the bottom surface, identical amount of the plurality of resonators are in alignment with different ones of the plurality of straight lines.

In an embodiment of the disclosure, on the top surface or the bottom surface, different amounts of the plurality of resonators are in alignment with at least two of the plurality of straight lines.

According to the multi-layered resonator circuit structure and the multi-layered filter circuit structure disclosed by the above embodiments, the resonators or the filters are disposed on the top surface and the bottom surface of the multi-layered substrate facing away from each other; in other words, at least one of the resonators or the filters is not disposed on the top surface of the multi-layered substrate. Accordingly, by moving at least one of the resonators or the filters from the top surface to the bottom surface, more spare space on the top surface is available for other electronic components besides the resonators, thereby improving the space utilization of the circuit board (i.e., multi-layered substrate) and facilitating the miniaturization of the circuit board.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
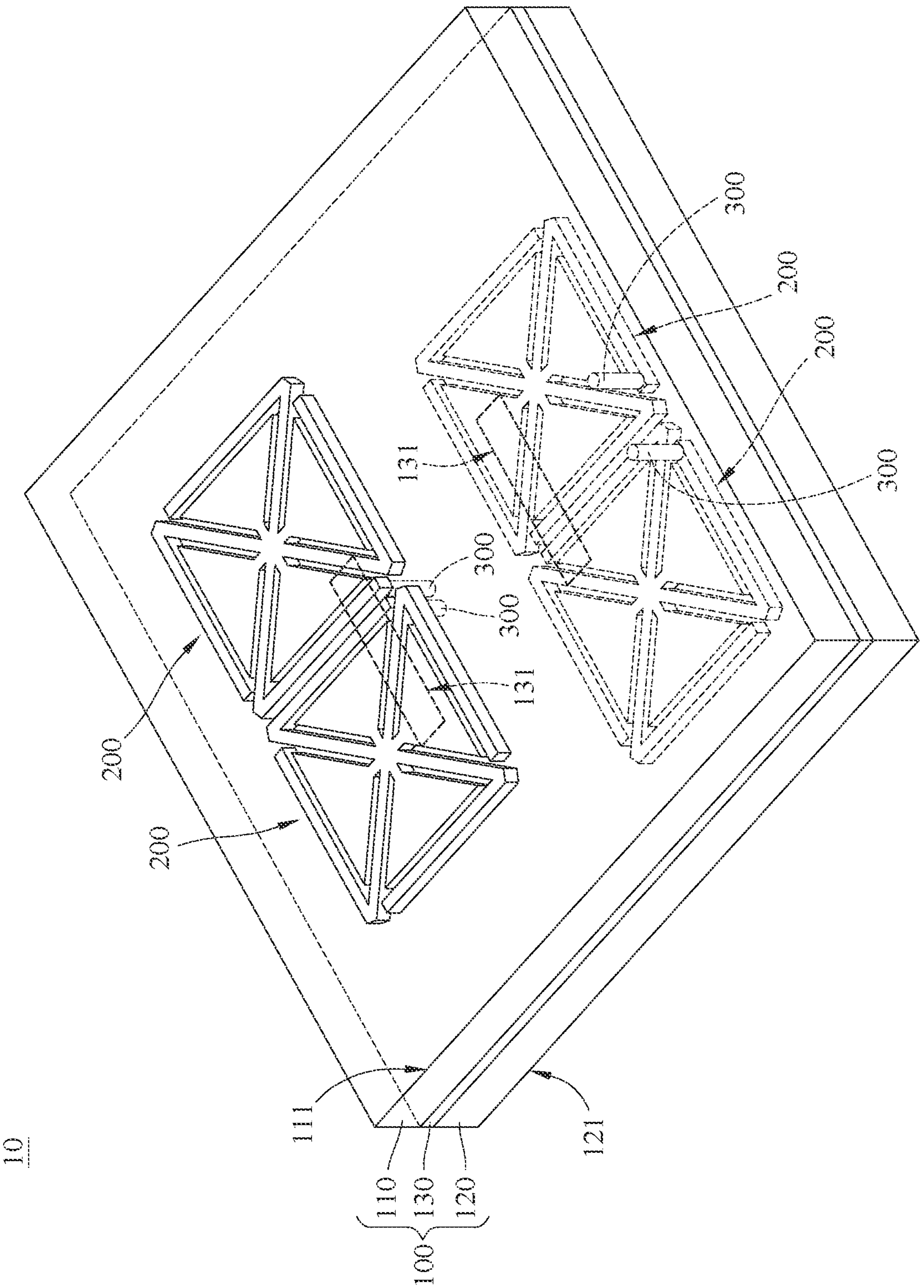
FIG. 1 is a schematic perspective view of a multi-layered resonator circuit structure according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Note that throughout the specification and the drawings, the same reference number refers to the same or similar component.

Figure 2:
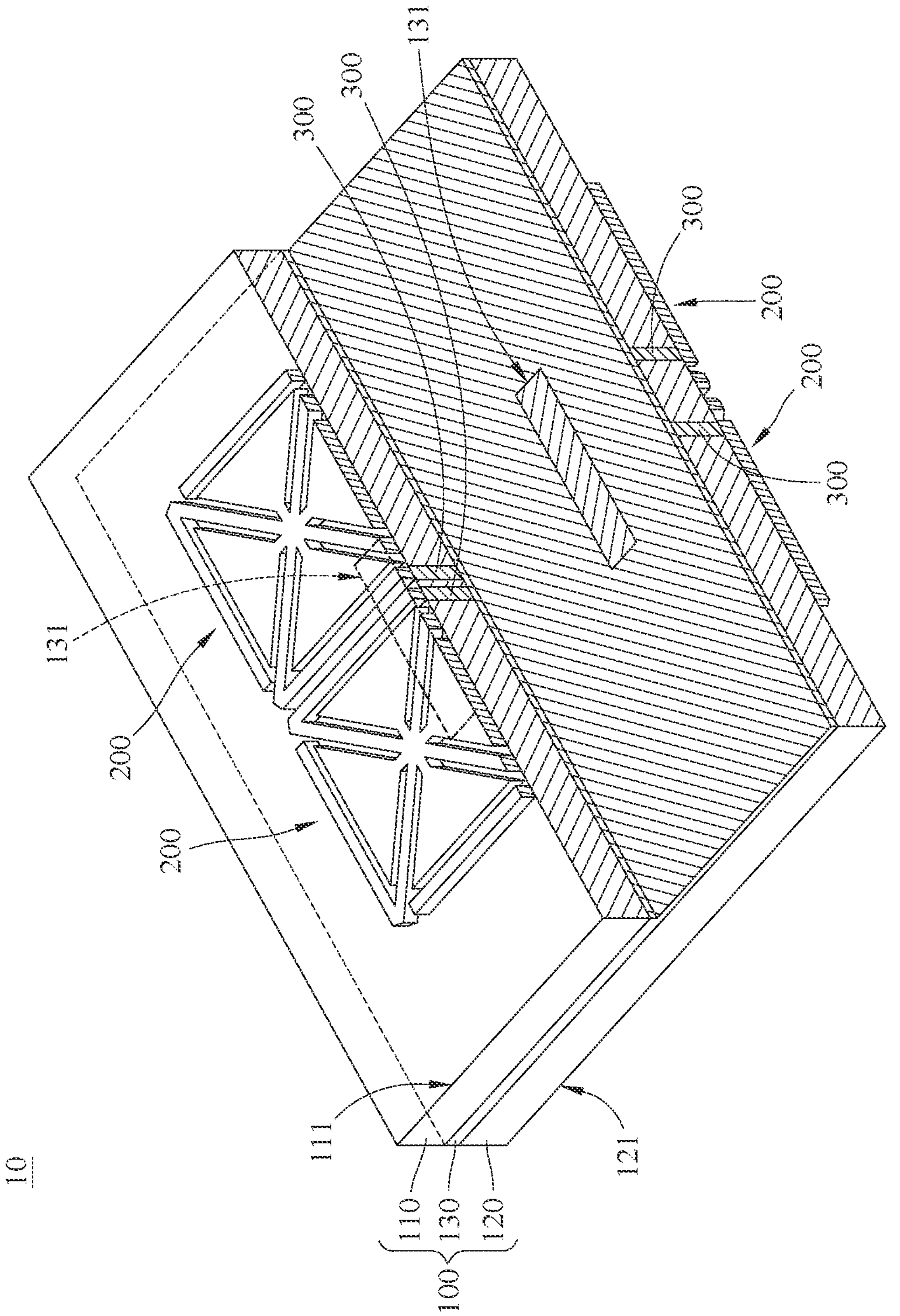
FIG. 2 is a perspective cross-sectional view of the multi-layered resonator circuit structure in FIG. 1.
Figure 3:
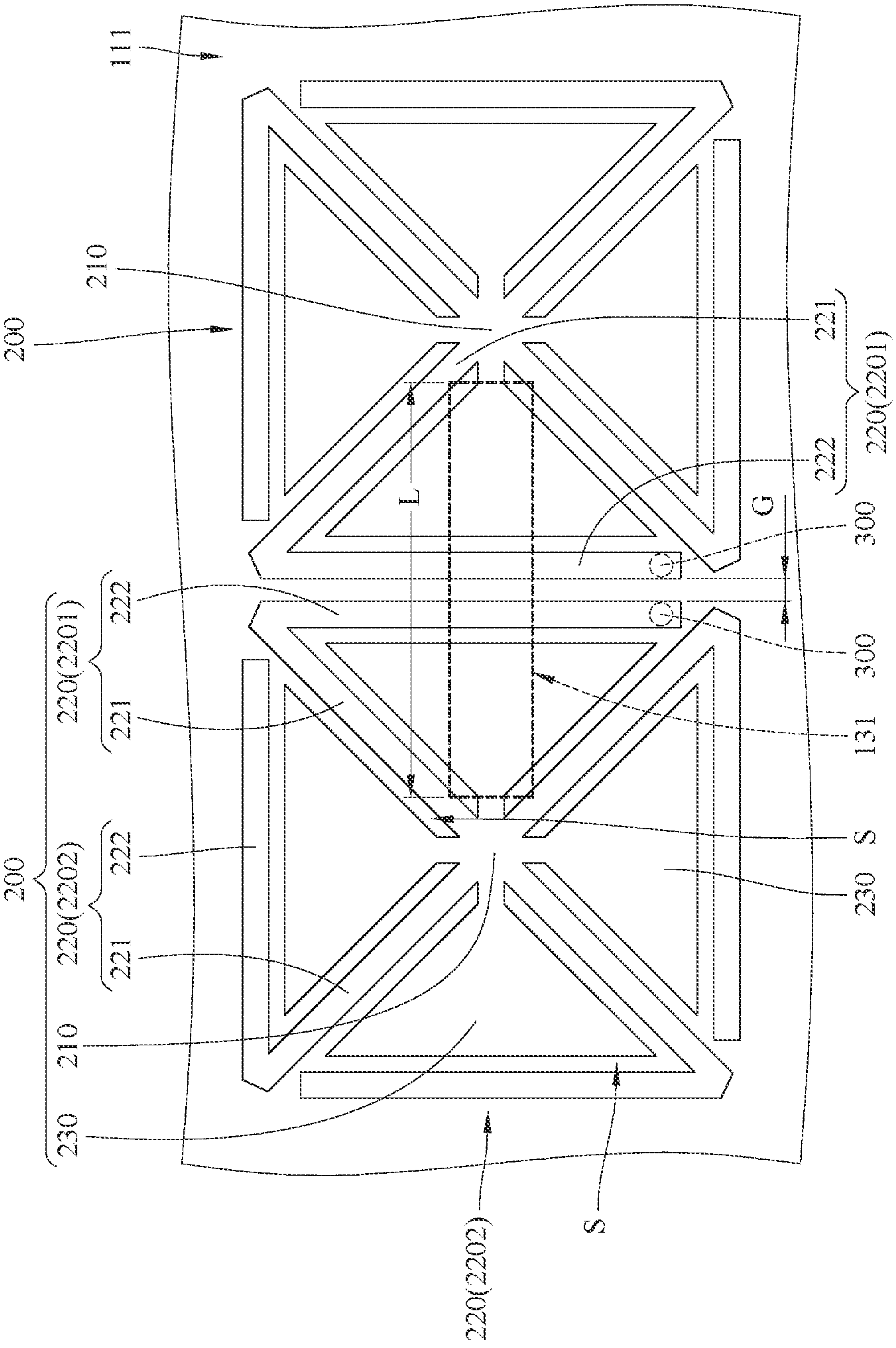
FIG. 3 is a top view of the multi-layered resonator circuit structure in FIG. 1.
Figure 4:
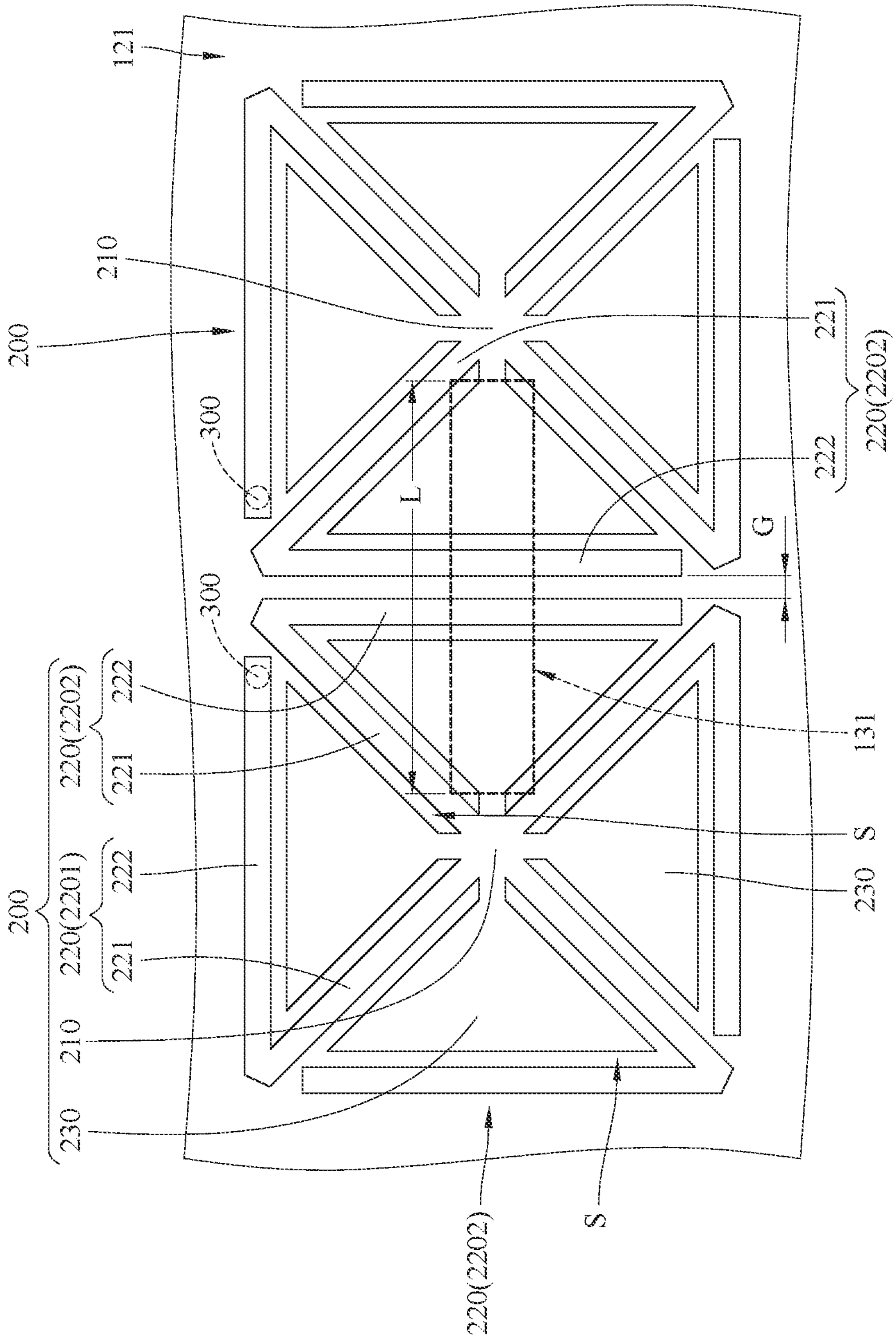
FIG. 4 is a bottom view of the multi-layered resonator circuit structure in FIG. 1.

Please refer to FIGS. 1 to 4. FIG. 1 is a schematic perspective view of a multi-layered resonator circuit structure 10 according to a first embodiment of the disclosure. FIG. 2 is a perspective cross-sectional view of the multi-layered resonator circuit structure 10 in FIG. 1. FIG. 3 is a top view of the multi-layered resonator circuit structure 10 in FIG. 1. FIG. 4 is a bottom view of the multi-layered resonator circuit structure 10 in FIG. 1.

In this embodiment, the multi-layered resonator circuit structure 10 includes a multi-layered substrate 100, a plurality of resonators 200, and a plurality of conductive components 300. The multi-layered substrate 100 has a top surface 111, a bottom surface 121, and a ground layer 130. The top surface 111 and the bottom surface 121 face away from each other, and the ground layer 130 is located between the top surface 111 and the bottom surface 121. In this embodiment, the multi-layered substrate 100 is, for example, a two-layered substrate or a two-layered circuit board. In detail, in this embodiment, the multi-layered substrate 100 includes a first dielectric layer 110 and a second dielectric layer 120. The top surface 111 and the bottom surface 121 are located on the first dielectric layer 110 and the second dielectric layer 120, respectively. In addition, the multi-layered substrate 100 further includes a ground layer 130. The first dielectric layer 110 and the second dielectric layer 120 are located on two opposite sides of the ground layer 130, respectively. The top surface 111 and the bottom surface 121 face away from the ground layer 130.

In this embodiment, the ground layer 130 has two opening slots 131 that are spaced apart from each other. In this embodiment, an outline of the opening slot 131 is in, for example, a bar shape; in other words, the opening slot 131 may be a bar shaped slot. Each opening slot 131 is filled with, for example, a dielectric material, but the disclosure is not limited thereto. In other embodiments, each opening slot may be filled with air instead of the dielectric material; in other words, the opening slot may be an empty slot which is absent of any solid filling therewith.

A part of the resonators 200 is/are disposed on the top surface 111, and the remaining part of the resonators 200 is/are disposed on the bottom surface 121; in other words, the resonators 200 appear on both of the top surface 111 and the bottom surface 121 of the multi-layered substrate 100. For example, there are two resonators 200 coupled to each other disposed on the top surface 111 and two resonators 200 disposed on the bottom surface 121.

In this embodiment, the quantity of the resonators 200 disposed on the top surface 111 is equal to the quantity of the resonators 200 disposed on the bottom surface 121, but the disclosure is not limited thereto. In other embodiments, the quantity of the resonators disposed on the top surface may be different from the quantity of the resonators disposed on the bottom surface.

The resonators 200 are the same or similar in structure, and thus only one of the resonators 200 will be described in detail hereinafter. The resonator 200 includes a joint 210 and a plurality of stubs 220. The stubs 220 are connected to the joint 210. The stubs 220 are, for example, one ground stub 2201 and three open stubs 2202; that is, in the resonator 200, there are one ground stub 2201 and three open stubs 2202 connected to the joint 210. In addition, the stubs 220 may be referred as transmission lines.

Each stub 220 has a bent shape. Specifically, the studs 220 each include an inner extension portion 221 and an outer extension portion 222 (that is, the ground stub 2201 and the open stubs 2202 each include one inner extension portion 221 and one outer extension portion 222), where the inner extension portion 221 is at an angle to the outer extension portion 222. In addition, the ground stub 2201 is at a specific angle to each open stub 2202. The inner extension portions 221 are connected to the joint 210. The outer extension portions 222 are connected to the inner extension portions 221, respectively. The outer extension portions 222 are non-parallel to the inner extension portions 221, respectively. In this embodiment, an outline of the resonator 200 is generally in a square shape. The inner extension portions 221 extend along, for example, the diagonals of the resonator 200, respectively. In other words, the inner extension portions 221 are, respectively, arranged along the radial directions of the joint 210. The outer extension portions 222 extend along the outer contour of the resonator 200, respectively. An angle between two of the inner extension portions 221 that extend along different diagonals of the resonator 200 is, for example, 90 degrees. An angle between one of the outer extension portions 222 and one of the inner extension portions 221 that are connected to each other is, for example, 45 degrees. With such configuration, the inner extension portion 221 and the outer extension portion 222 of one of the stubs 220 and the inner extension portion 221 of adjacent stub 220 together form an arrangement area S therebetween. As shown, the stubs 220 of the resonator 200 may define four arrangement areas S, and an outline of each arrangement area S may be in an isosceles triangle shape.

In this embodiment, the resonator 200 may further include a plurality of leaves 230. The leaves 230 are located in the arrangement areas S, respectively. The leaves 230 are connected to the joint 210. With respect to one of the leaves 230 and a pair of the inner extension portion 221 and the outer extension portion 222 surrounding that leaf 230, the leave 230 is, for example, spaced apart from the inner extension portion 221 and the outer extension portion 222 while being filled in the arrangement area S as much as possible. In other words, the leaves 230 are not in direct contact with the stubs 220 and are sized and shaped to be close to the arrangement area S. Accordingly, an arrangement area of each leaf 230 is increased to widen the stopband of the resonator 200. Furthermore, the stopband of the resonator 200 may be widened by increasing the quantity of the open stubs 2202.

In this embodiment, on each side of the multi-layered substrate 100, two stubs 220 of the two resonators 200 are arranged side by side to couple the two resonators 200 to each other. For example, regarding the resonators 200 on the top surface 111 as shown in FIG. 3, the outer extension portions 222 of the ground stubs 2201, that are arranged parallel to each other and are arranged side by side, enable the coupling between the resonators 200. For example, regarding the resonators 200 on the bottom surface 121 as shown in FIG. 4, the outer extension portions 222 of the open stubs 2202, that are arranged parallel to each other and are arranged side by side, enable the coupling between the resonators 200. In other embodiments, on each side of the multi-layered substrate, the outer extension portion of the ground stub and the outer extension portion of the open stub may be arranged parallel to each other and may be arranged side by side to enable the coupling between the two resonators. In addition, the smaller the gap G between the two outer extension portions 222 of the two stubs 220 is, the stronger the coupling between the two resonators 200 coupled to each other is.

One of the opening slots 131 corresponds to the two stubs 220 on the top surface 111, and the other opening slot 131 corresponds to the stubs 220 coupled to each other on the bottom surface 121. The two opening slots 131 are the same or similar in structure, and thus only one of the opening slots 131 will be described in detail hereinafter. For example, with respect to the opening slot 131 that corresponds to the resonators 200 on the top surface 111, an orthogonal projection of the opening slot 131 onto the top surface 111 is located between the two joints 210 of the resonators 200, and is perpendicular to the outer extension portions 222 of the stubs 220 coupled to each other. The relationship between the other opening slot 131 and the resonators 200 on the bottom surface 121 is the same as or similar to those described above, and thus the relevant descriptions are omitted.

The opening slots 131 are able to make the coupling between the resonators 200 stronger. In this embodiment, a length L of the opening slot 131 is positively correlated with the strength of the coupling between the resonators 200 coupled to each other. In other words, the longer the opening slot 131 is, the stronger the coupling between the resonators 200 coupled to each other is.

The conductive components 300 are, for example, conductive blind vias. The conductive components 300 are located in the first dielectric layer 110 and the second dielectric layer 120 of the multi-layered substrate 100, respectively. The ground stubs 2201 of the resonators 200 are electrically connected to the ground layer 130, respectively, via the conductive components 300.

Figure 5:
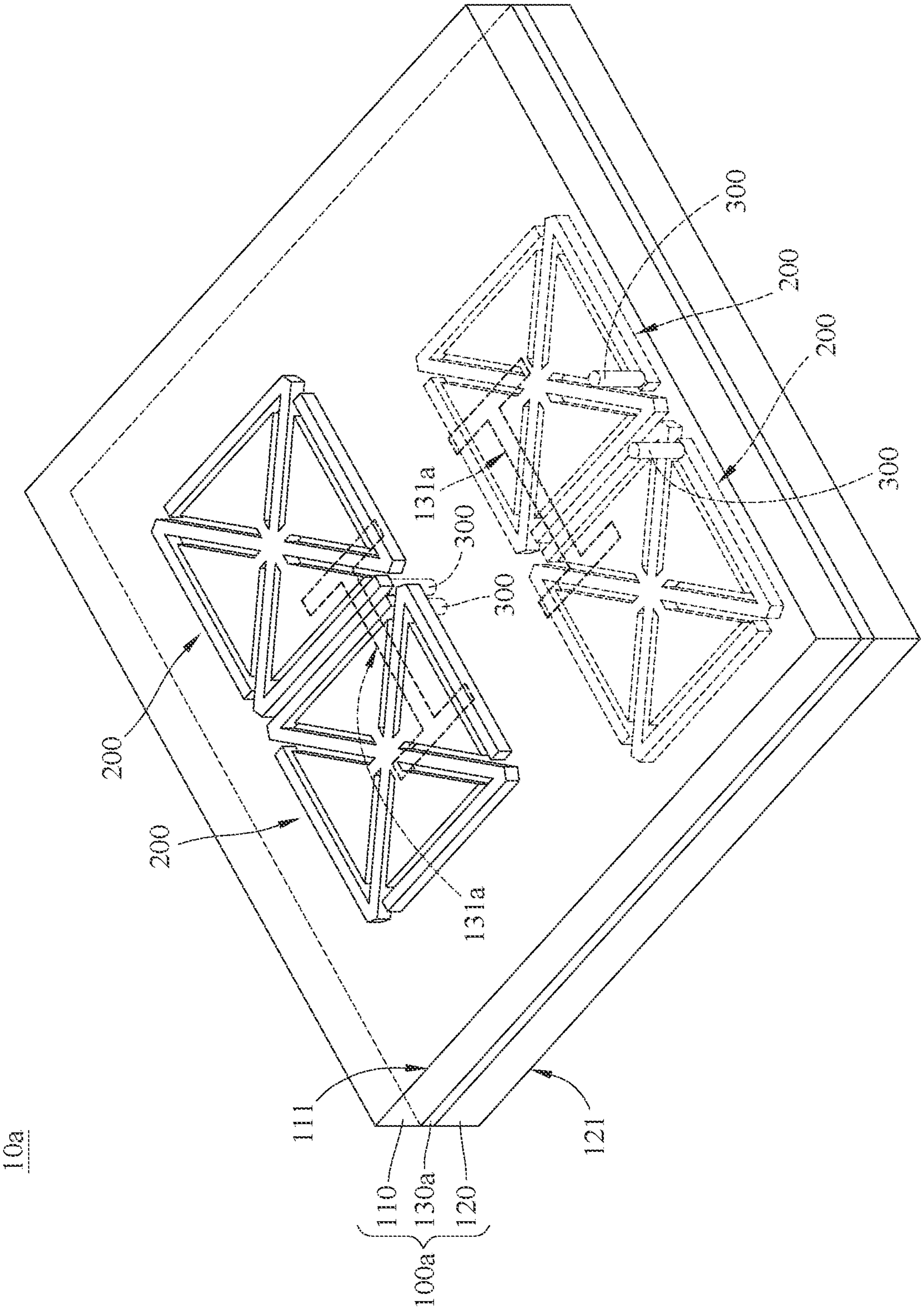
FIG. 5 is a schematic perspective view of a multi-layered resonator circuit structure according to a second embodiment of the disclosure.
Figure 6:
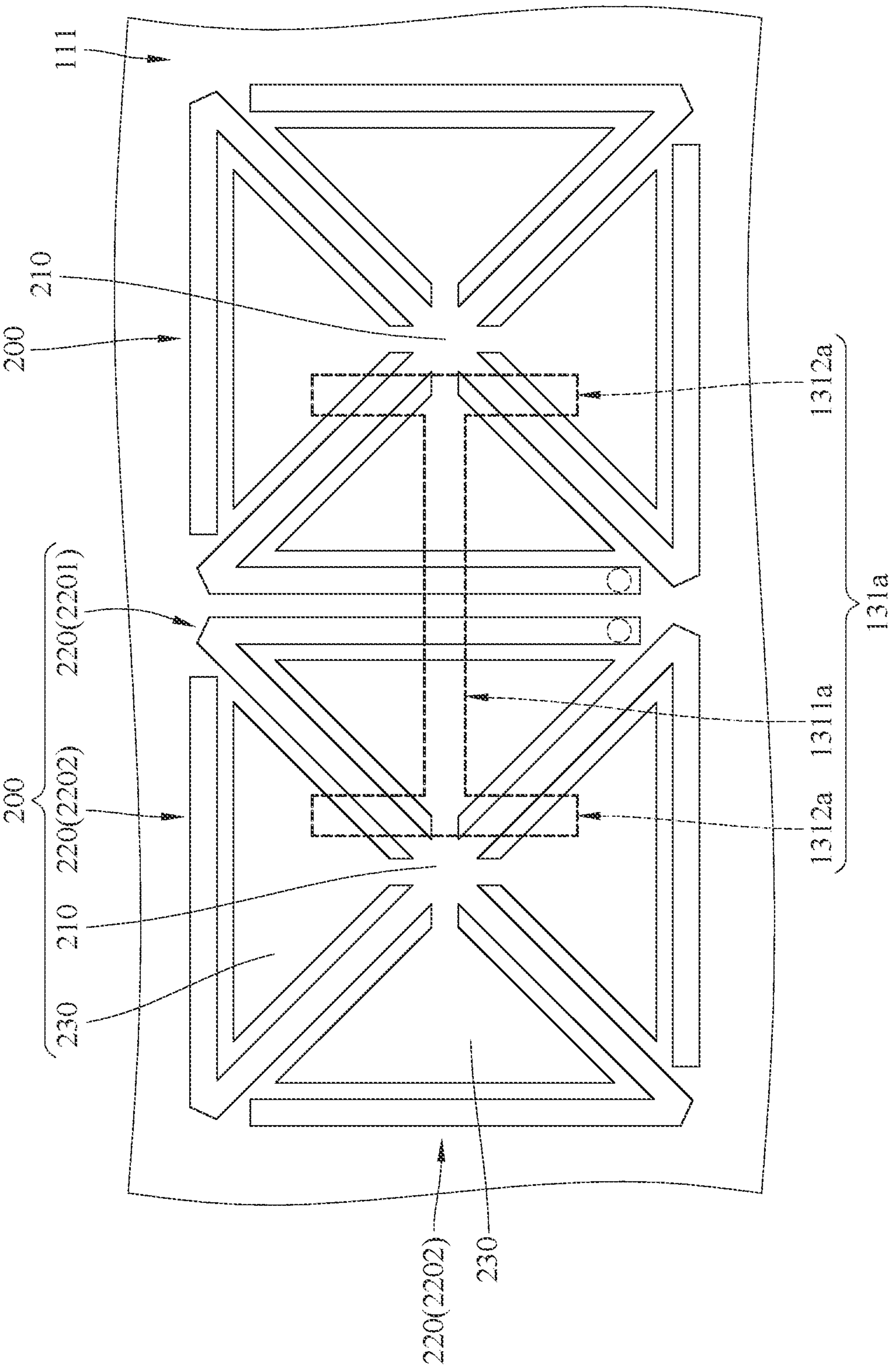
FIG. 6 is a top view of the multi-layered resonator circuit structure in FIG. 5.

Please refer to FIGS. 5 and 6. FIG. 5 is a schematic perspective view of a multi-layered resonator circuit structure 10*a* according to a second embodiment of the disclosure. FIG. 6 is a top view of the multi-layered resonator circuit structure 10*a* in FIG. 5. The multi-layered resonator circuit structure 10*a* according to the second embodiment of the disclosure includes a multi-layered substrate 100*a*, a plurality of resonators 200, and a plurality of conductive components 300. The multi-layered resonator circuit structure 10*a* of this embodiment is similar to the multi-layered resonator circuit structure 10 of the first embodiment, and the only difference therebetween is the shape of opening slots 131*a* in a ground layer 130*a* of the multi-layered substrate 100*a*.

As shown in FIG. 6, the opening slot 131*a* includes a main slot portion 1311*a* and two secondary slot portions 1312*a*. With respect to the opening slot 131*a* that corresponds to the two resonators 200 disposed on a top surface 111, an orthogonal projection of the main slot portion 1311*a* onto the top surface 111 is located between two joints 210 of the resonators 200, and is perpendicular to outer extension portions 222 of two stubs 220 coupled to each other. The two secondary slot portions 1312*a* are connected to two opposite ends of the main slot portion 1311*a*, respectively. The two secondary slot portions 1312*a* are perpendicular to the main slot portion 1311*a*. The relationship between the other opening slot 131*a* and the resonators 200 disposed on a bottom surface 121 is the same as or similar to those described above, and thus the relevant descriptions are omitted.

Figure 7:
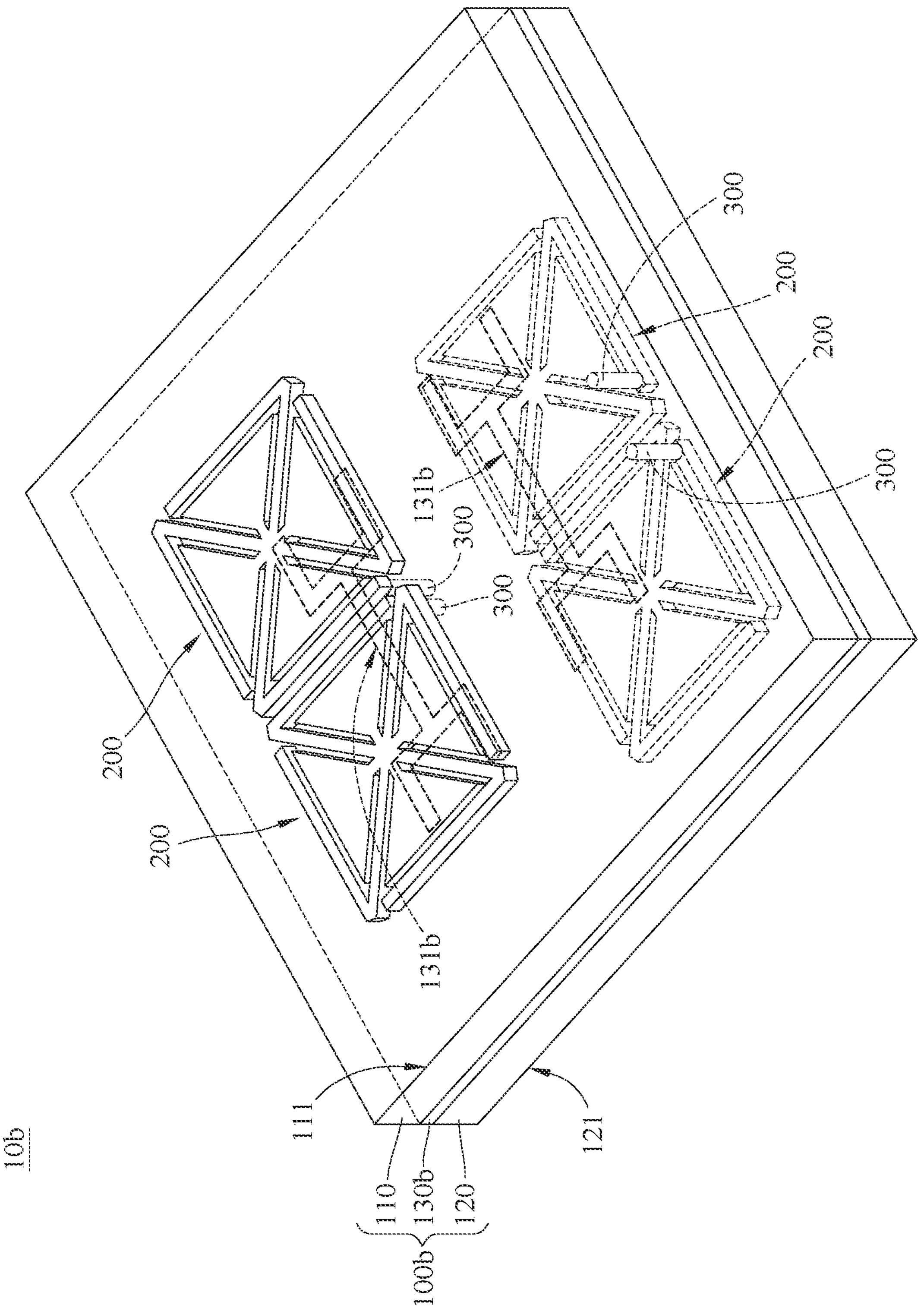
FIG. 7 is a schematic perspective view of a multi-layered resonator circuit structure according to a third embodiment of the disclosure.
Figure 8:
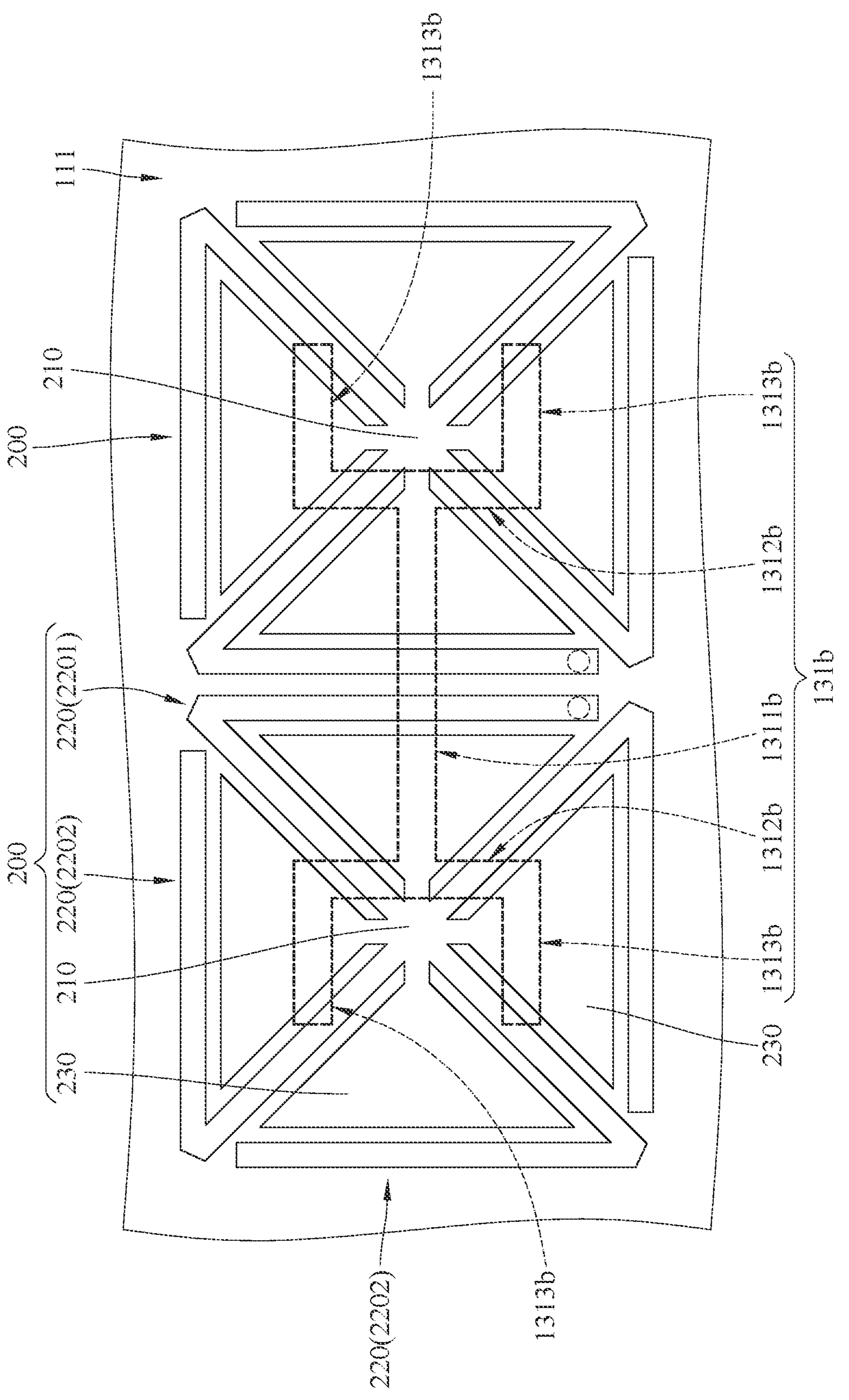
FIG. 8 is a top view of the multi-layered resonator circuit structure in FIG. 7.

Please refer to FIGS. 7 and 8. FIG. 7 is a schematic perspective view of a multi-layered resonator circuit structure 10*b* according to a third embodiment of the disclosure. FIG. 8 is a top view of the multi-layered resonator circuit structure 10*b* in FIG. 7. The multi-layered resonator circuit structure 10*b* according to the third embodiment of the disclosure includes a multi-layered substrate 100*b*, a plurality of resonators 200, and a plurality of conductive components 300. The multi-layered resonator circuit structure 10*b* of this embodiment is similar to the multi-layered resonator circuit structure 10 of the first embodiment, and the only difference therebetween is the shape of opening slots 131*b* in a ground layer 130*b* of the multi-layered substrate 100*b*.

As shown in FIG. 8, the opening slot 131*b* includes a main slot portion 1311*b*, two secondary slot portions 1312*b*, and a plurality of tertiary slot portions 1313*b*. With respect to the opening slot 131*b* that corresponds to the two resonators 200 disposed on a top surface 111, an orthogonal projection of the main slot portion 1311*b* onto the top surface 111 is located between two joints 210 of the resonators 200, and is perpendicular to outer extension portions 222 of two stubs 220 coupled to each other. The two secondary slot portions 1312*b* are connected to two opposite ends of the main slot portion 1311*b*, respectively. The two secondary slot portions 1312*b* are perpendicular to the main slot portion 1311*b*. The tertiary slot portions 1313*b* are connected to opposite ends of the two secondary slot portions 1312*b*, respectively. The tertiary slot portions 1313*b* are parallel to the main slot portion 1311*b*. The relationship between the other opening slot 131*b* and the resonators 200 disposed on a bottom surface 121 is the same as or similar to those described above, and thus the relevant descriptions are omitted.

Figure 9:
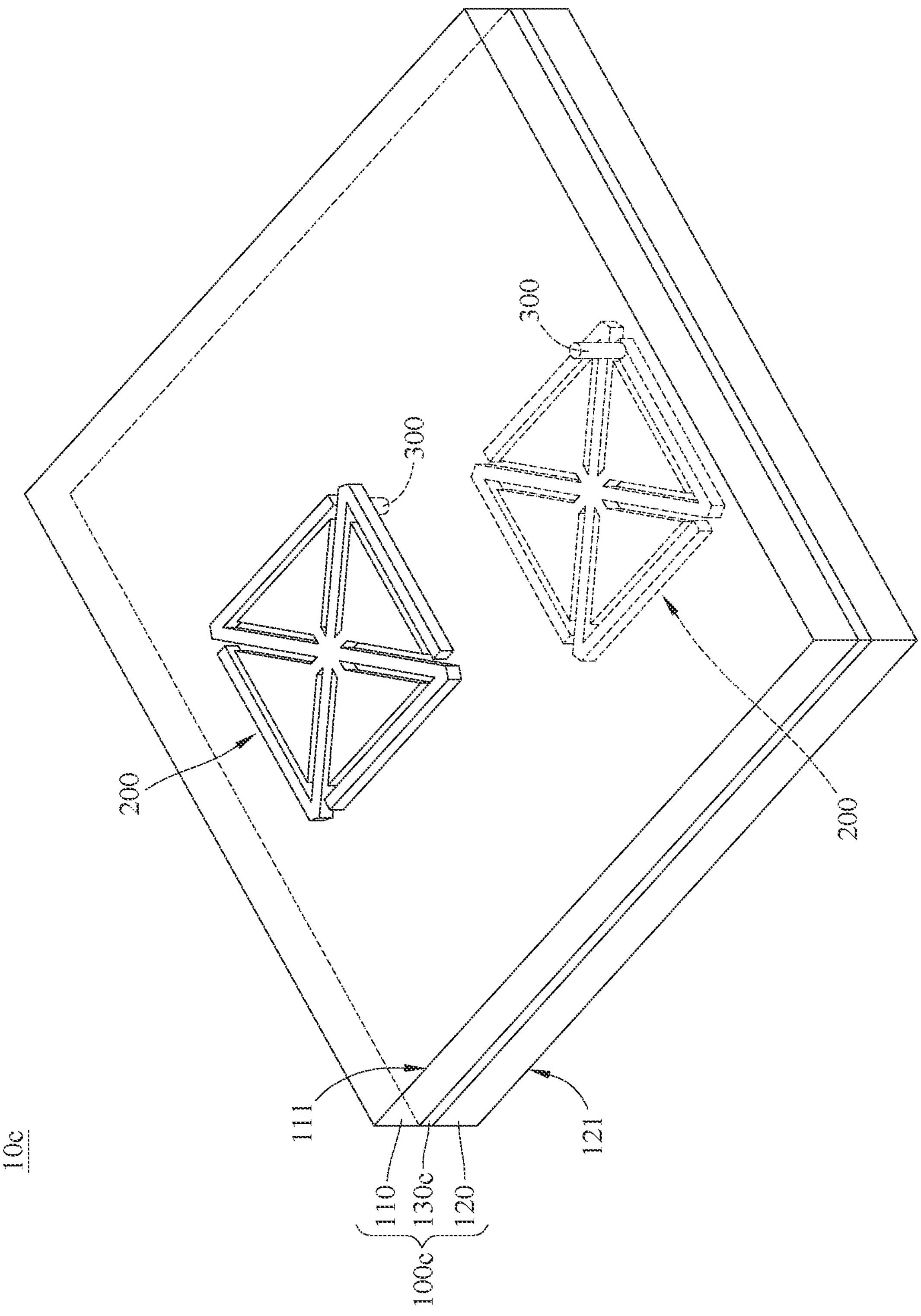
FIG. 9 is a schematic perspective view of a multi-layered resonator circuit structure according to a fourth embodiment of the disclosure.

Please refer to FIG. 9. FIG. 9 is a schematic perspective view of a multi-layered resonator circuit structure 10*c* according to a fourth embodiment of the disclosure. The multi-layered resonator circuit structure 10*c* according to the fourth embodiment of the disclosure includes a multi-layered substrate 100*c*, a plurality of resonators 200, and a plurality of conductive components 300. The multi-layered resonator circuit structure 10*c* of this embodiment is similar to the multi-layered resonator circuit structure 10 of the first embodiment, and the only difference therebetween will be described in detail below. In this embodiment, as shown in FIG. 9, a ground layer 130*c* of the multi-layered substrate 100*c* does not have the opening slot 131 shown in FIG. 1, there is only one resonator 200 disposed on a top surface 111, and there is only one resonator 200 disposed on a bottom surface 121. In this embodiment, the resonator 200 disposed on the top surface 111 and the resonator 200 disposed on the bottom surface 121 are arranged in an alternate manner, and thus the ground layer 130*c* does not have the opening slot 131 shown in FIG. 1, but the disclosure is not limited thereto. In other embodiments, the resonator disposed on the top surface and the resonator disposed on the bottom surface may partially overlap with each other, and the ground layer may have an opening slot between the resonators; in other words, the ground layer may have an opening slot located between two resonators which are arranged along a vertical direction of the multi-layered substrate.

Figure 10:
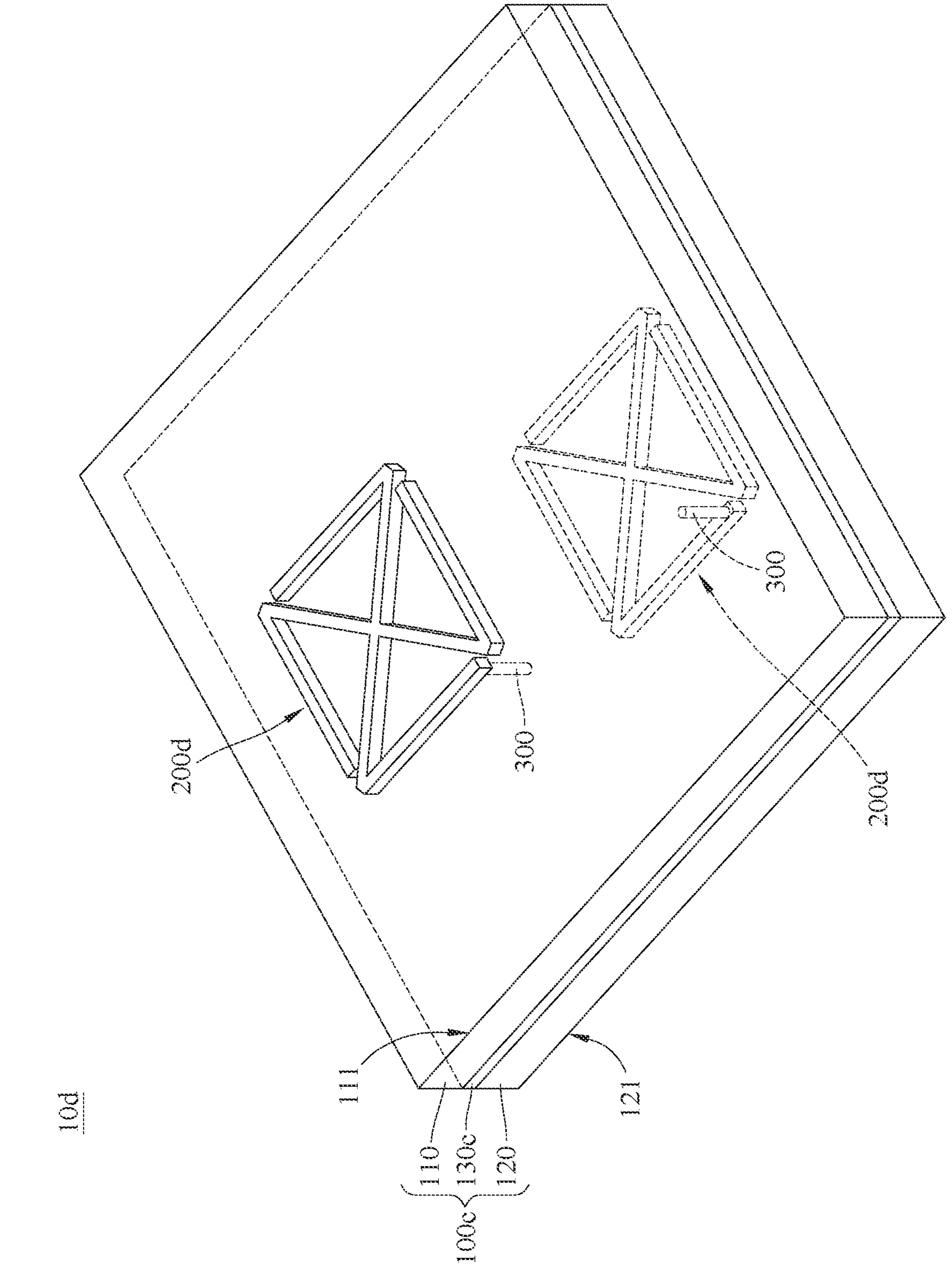
FIG. 10 is a schematic perspective view of a multi-layered resonator circuit structure according to a fifth embodiment of the disclosure.
Figure 11:
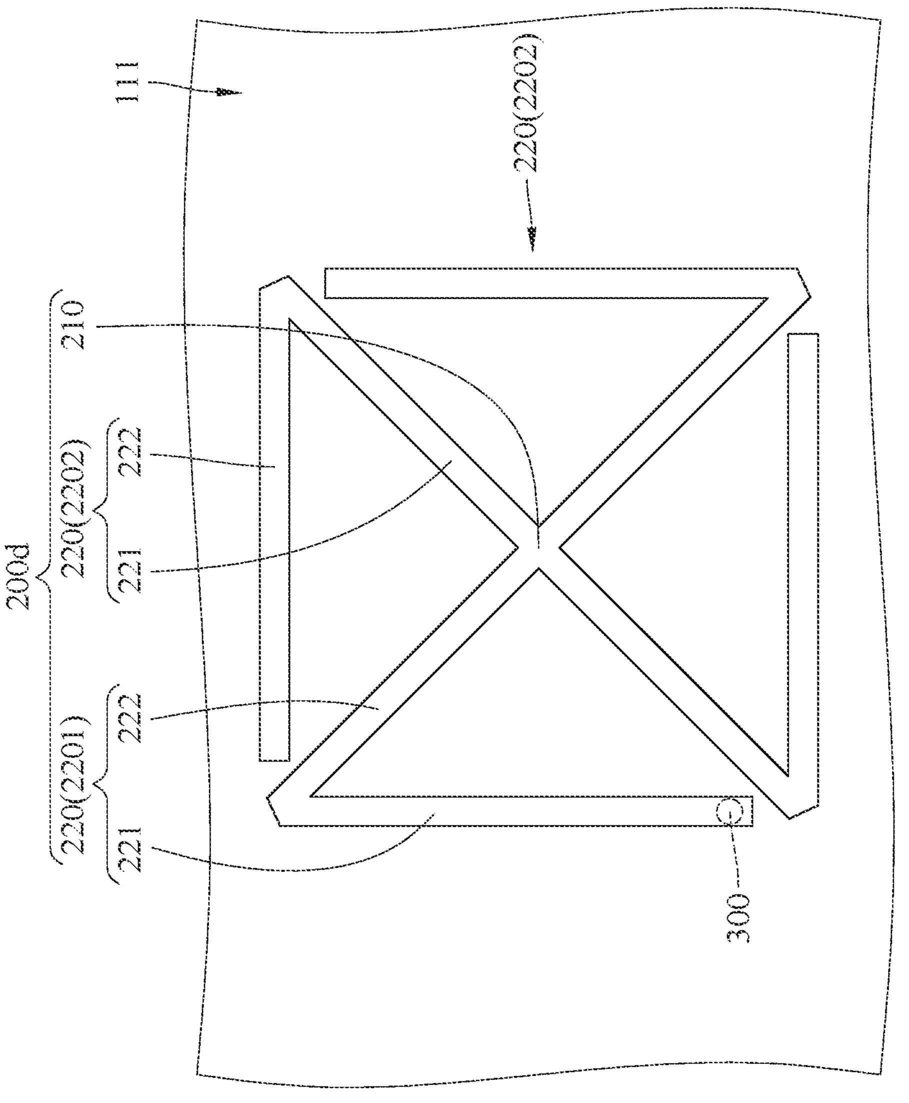
FIG. 11 is a top view of the multi-layered resonator circuit structure in FIG. 10.

The disclosure is not limited by the configuration of each resonator. Please refer to FIGS. 10 and 11. FIG. 10 is a schematic perspective view of a multi-layered resonator circuit structure 10*d* according to a fifth embodiment of the disclosure. FIG. 11 is a top view of the multi-layered resonator circuit structure 10*d* in FIG. 10. The multi-layered resonator circuit structure 10*d* according to the fifth embodiment of the disclosure includes a multi-layered substrate 100*c*, a plurality of resonators 200*d*, and a plurality of conductive components 300. The multi-layered resonator circuit structure 10*d* of this embodiment is similar to the multi-layered resonator circuit structure 10*c* of the fourth embodiment, and the only difference therebetween is the shape of the resonators 200*d*.

As shown in FIG. 11, each resonator 200*d* includes one joint 210 and a plurality of stubs 220 connected to the joint 210. The stubs 220 are, for example, one ground stub 2201 and three open stubs 2202. Each stub 220 has a bent shape and includes an inner extension portion 221 and an outer extension portion 222. The inner extension portions 221 are connected to the joint 210. The outer extension portions 222 are connected to the inner extension portions 221, respectively. The outer extension portions 222 are non-parallel to the inner extension portions 221, respectively. In this embodiment, each resonator 200*d*, for example, does not include the leaves 230 shown in FIG. 3.

Figure 12:
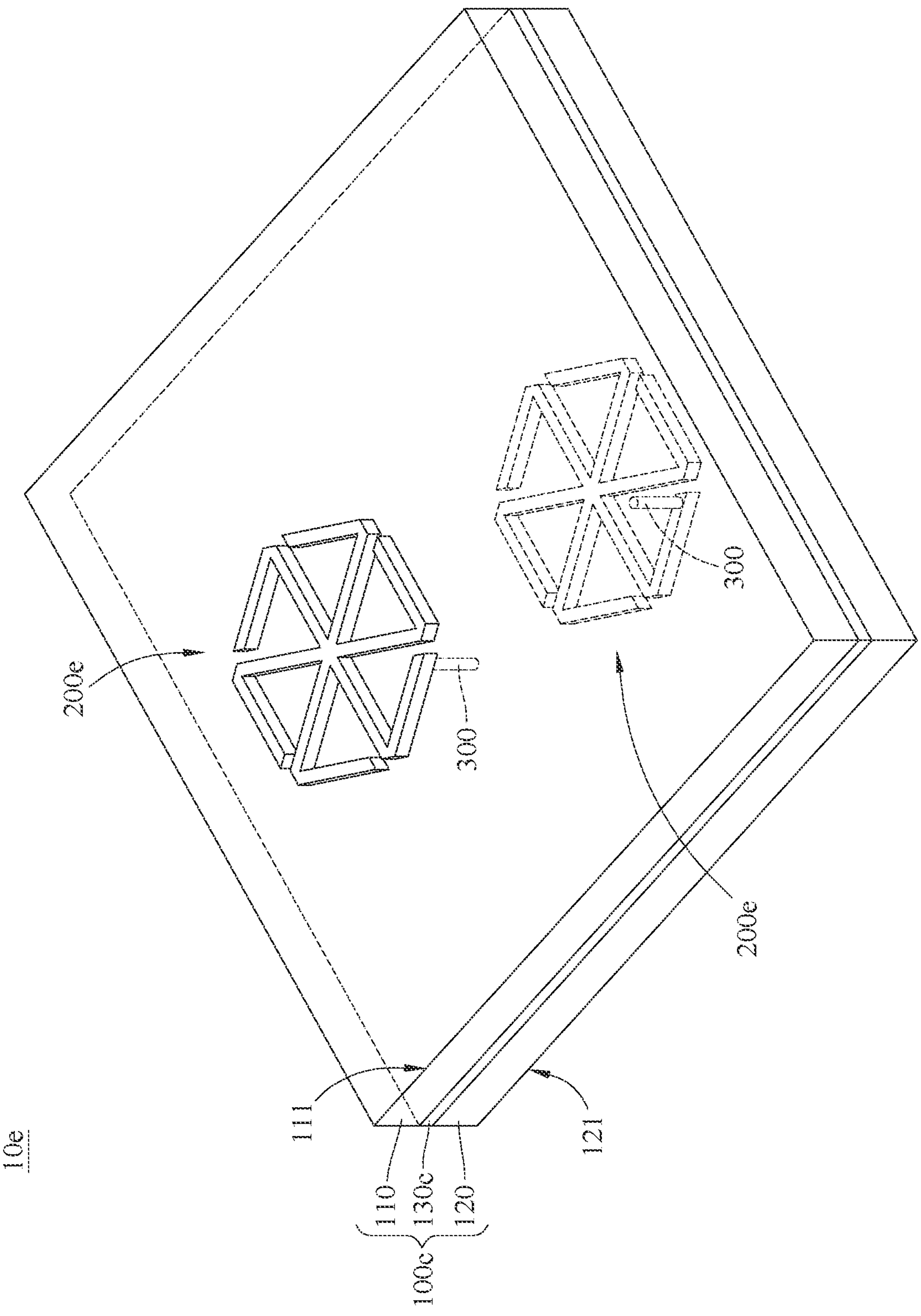
FIG. 12 is a schematic perspective view of a multi-layered resonator circuit structure according to a sixth embodiment of the disclosure.
Figure 13:
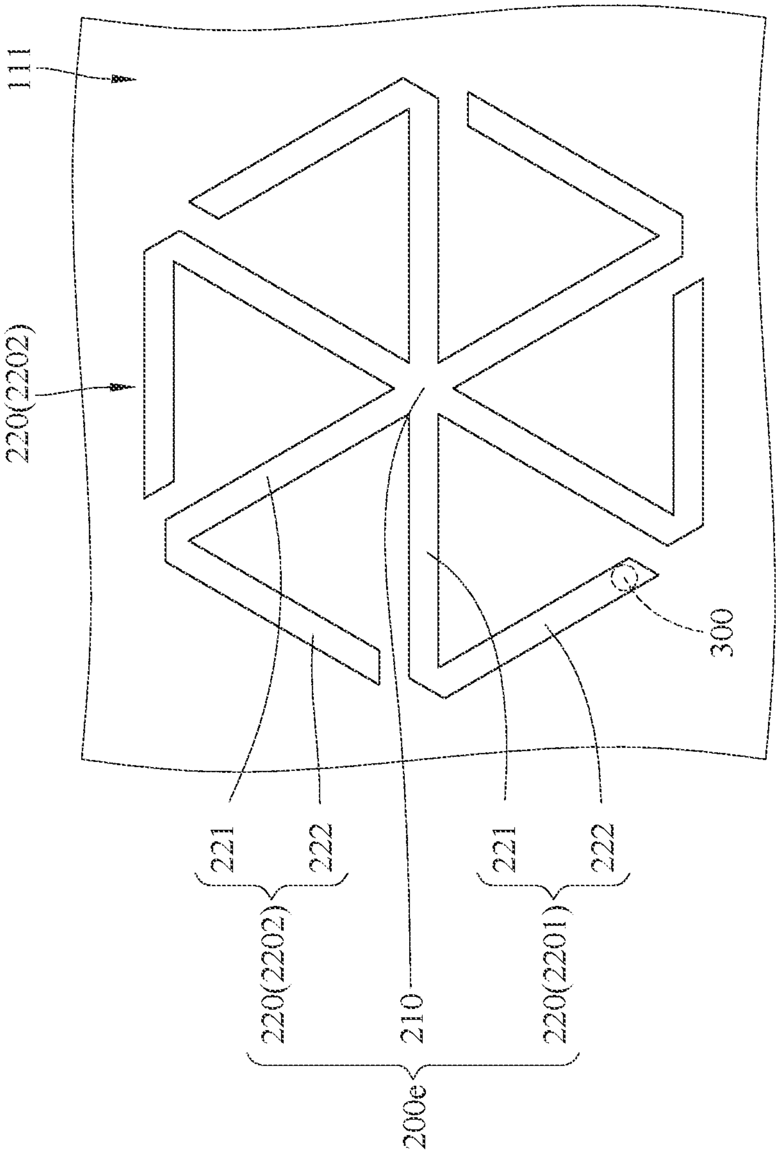
FIG. 13 is a top view of the multi-layered resonator circuit structure in FIG. 12.

The disclosure is not limited by the quantity of the open stubs. Please refer to FIGS. 12 and 13. FIG. 12 is a schematic perspective view of a multi-layered resonator circuit structure 10*e* according to a sixth embodiment of the disclosure. FIG. 13 is a top view of the multi-layered resonator circuit structure 10*e* in FIG. 12. The multi-layered resonator circuit structure 10*e* according to the sixth embodiment of the disclosure includes a multi-layered substrate 100*c*, a plurality of resonators 200*e*, and a plurality of conductive components 300. The multi-layered resonator circuit structure 10*c* of this embodiment is similar to the multi-layered resonator circuit structure 10*d* of the fifth embodiment, and the only difference therebetween is the quantity of open stubs included in each resonator 200*e*. In this embodiment, each resonator 200*e* includes five open stubs.

Figure 14:
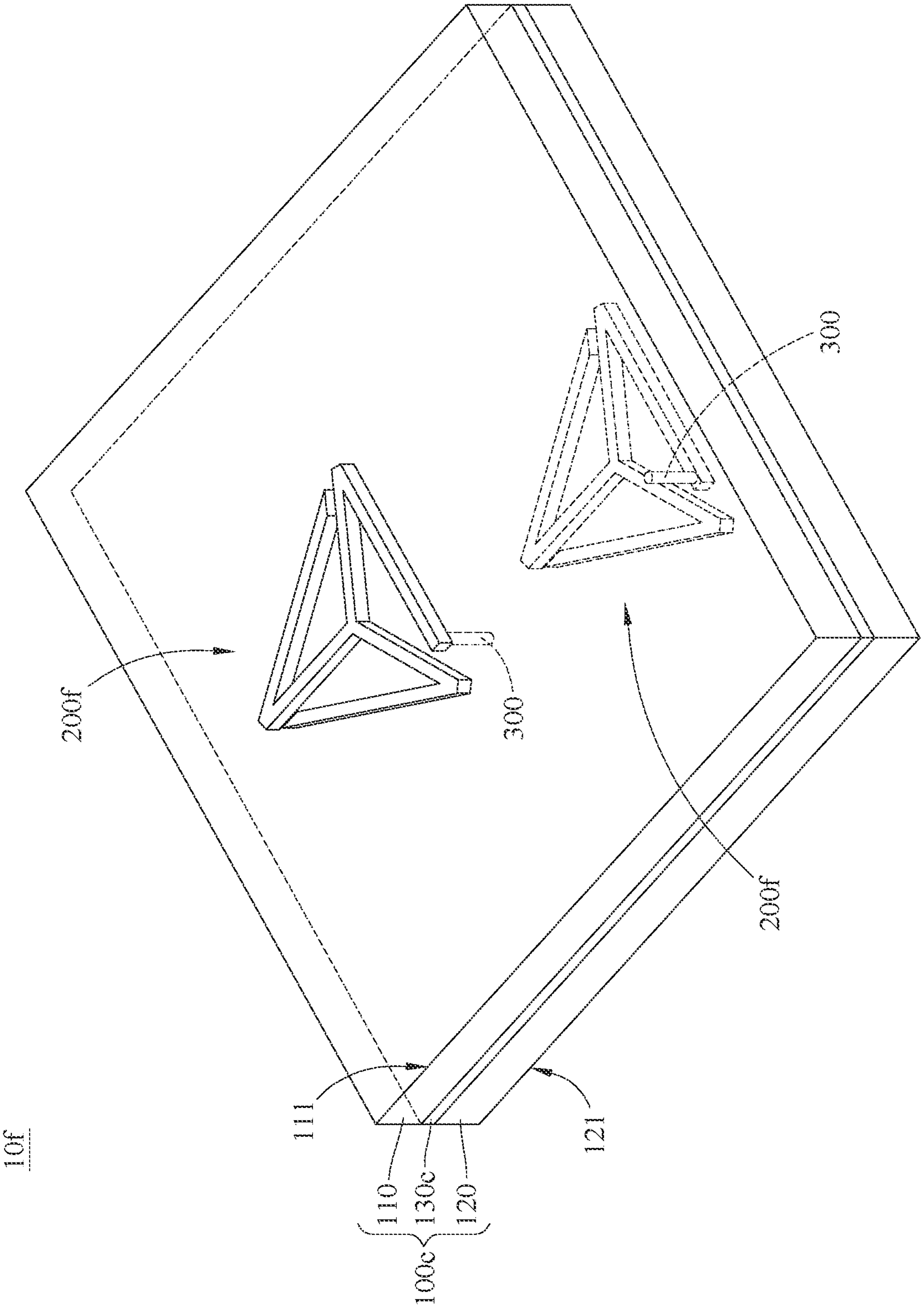
FIG. 14 is a schematic perspective view of a multi-layered resonator circuit structure according to a seventh embodiment of the disclosure.
Figure 15:
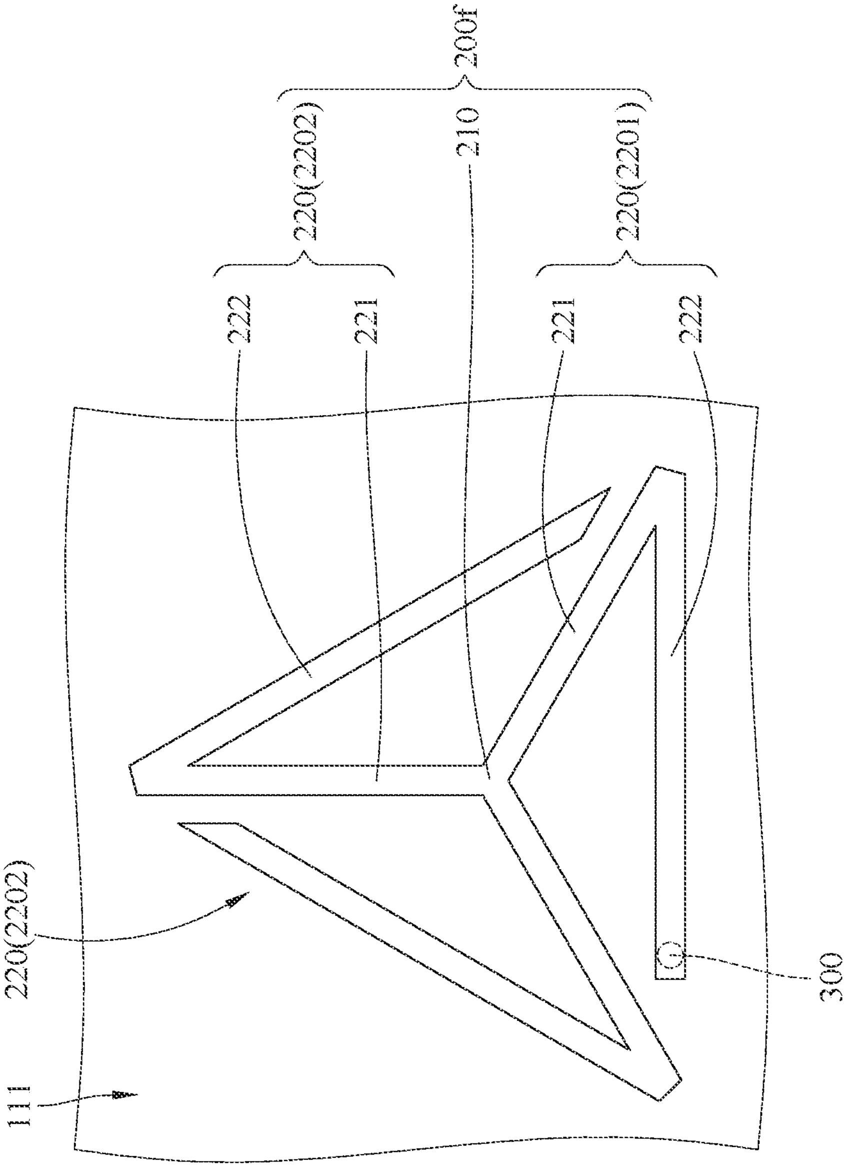
FIG. 15 is a top view of the multi-layered resonator circuit structure in FIG. 14.

Please refer to FIGS. 14 and 15. FIG. 14 is a schematic perspective view of a multi-layered resonator circuit structure 10*f* according to a seventh embodiment of the disclosure. FIG. 15 is a top view of the multi-layered resonator circuit structure 10*f* in FIG. 14. The multi-layered resonator circuit structure 10*f* according to the seventh embodiment of the disclosure includes a multi-layered substrate 100*c*, a plurality of resonators 200*f*, and a plurality of conductive components 300. The multi-layered resonator circuit structure 10*f* of this embodiment is similar to the multi-layered resonator circuit structure 10*d* of the fifth embodiment, and the only difference therebetween is the quantity of open stubs included in each resonator 200*f*. In this embodiment, each resonator 200*f* includes two open stubs.

Figure 16:
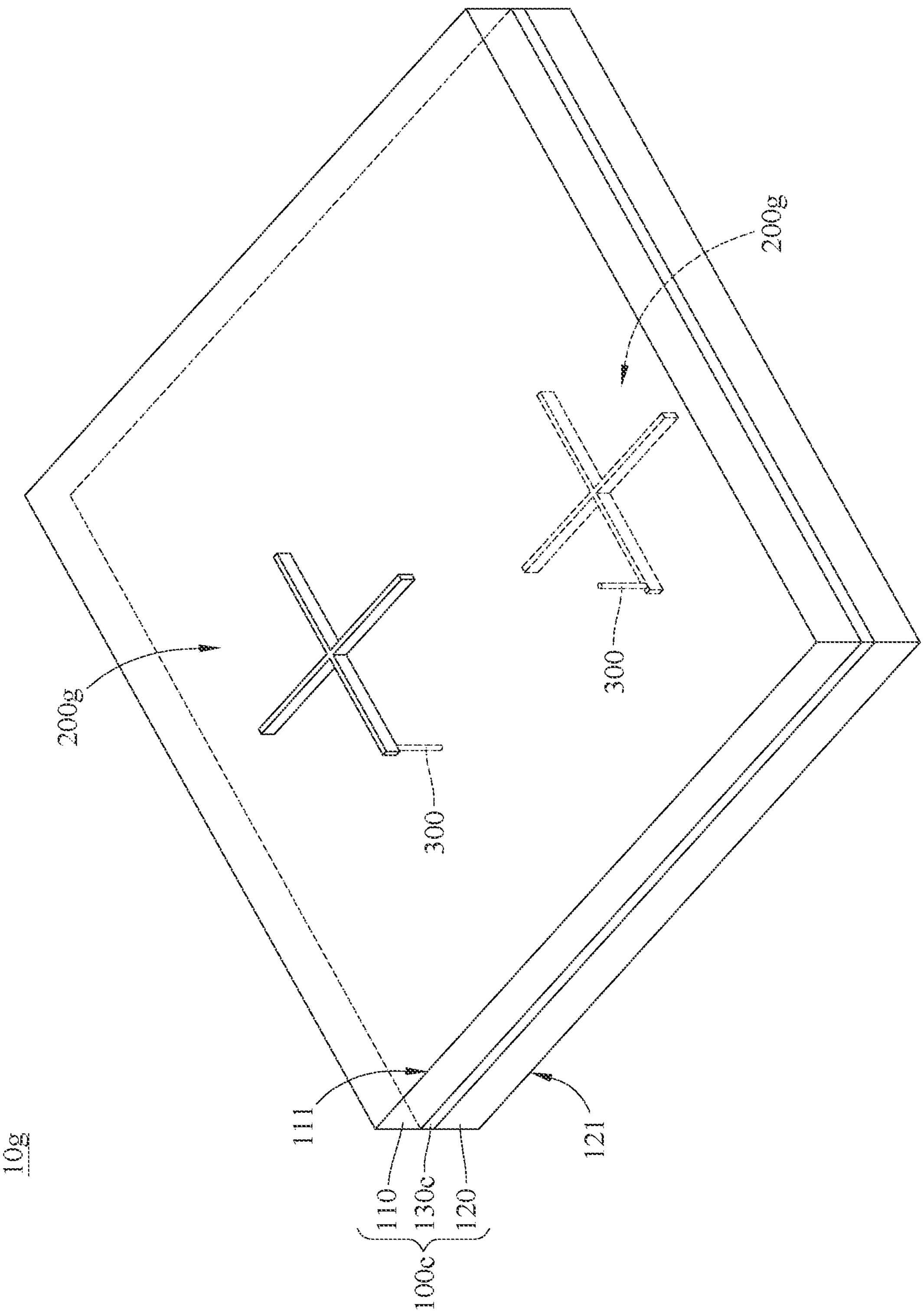
FIG. 16 is a schematic perspective view of a multi-layered resonator circuit structure according to an eighth embodiment of the disclosure.
Figure 17:
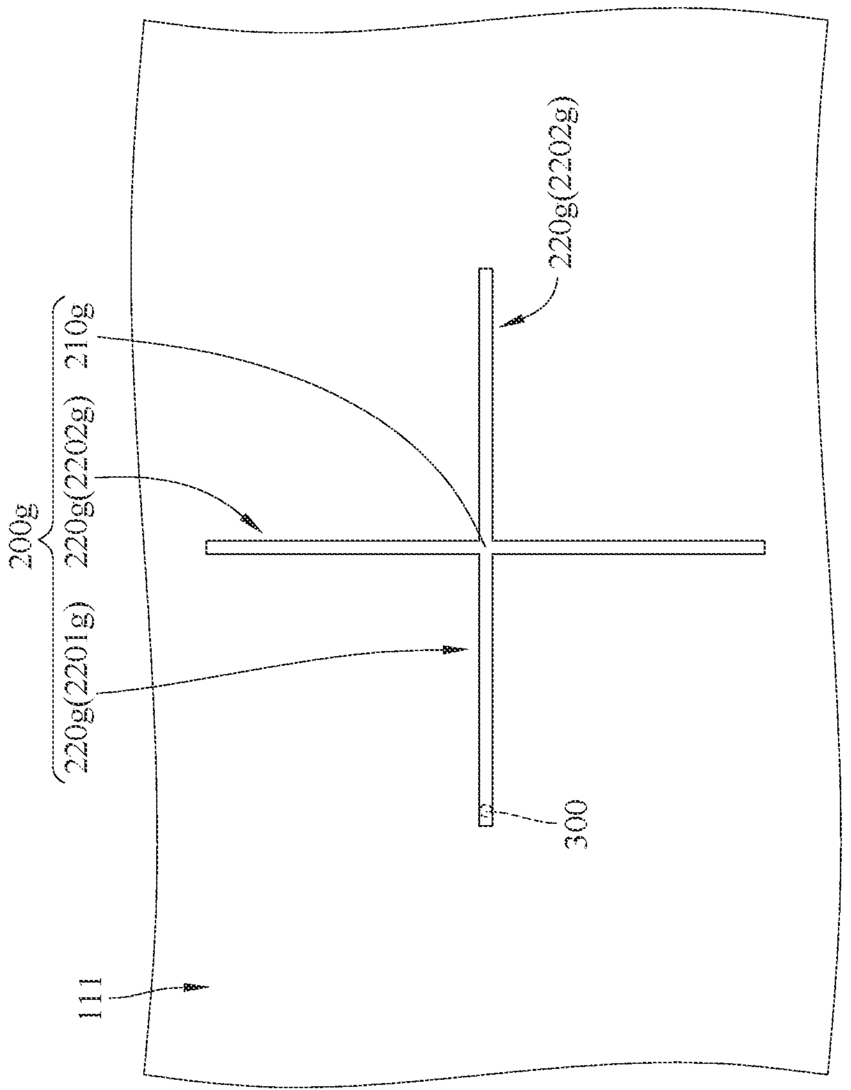
FIG. 17 is a top view of the multi-layered resonator circuit structure in FIG. 16.

Please refer to FIGS. 16 and 17. FIG. 16 is a schematic perspective view of a multi-layered resonator circuit structure 10*g* according to an eighth embodiment of the disclosure. FIG. 17 is a top view of the multi-layered resonator circuit structure 10*g* in FIG. 16. The multi-layered resonator circuit structure 10*g* according to the eighth embodiment of the disclosure includes a multi-layered substrate 100*c*, a plurality of resonators 200*g*, and a plurality of conductive components 300. The multi-layered resonator circuit structure 10*g* of this embodiment is similar to the multi-layered resonator circuit structure 10*d* of the fifth embodiment, and only difference therebetween will be described in detail below. In this embodiment, as shown in FIGS. 16 and 17, each resonator 200*g* includes a joint 210*g* and a plurality of stubs 220*g*. The stubs 220*g* are connected to the joint 210*g*. The stubs 220*g* are, for example, one ground stub 2201*g* and three open stubs 2202*g*. Each stub 220 is in a straight shape instead of a bent shape.

Figure 18:
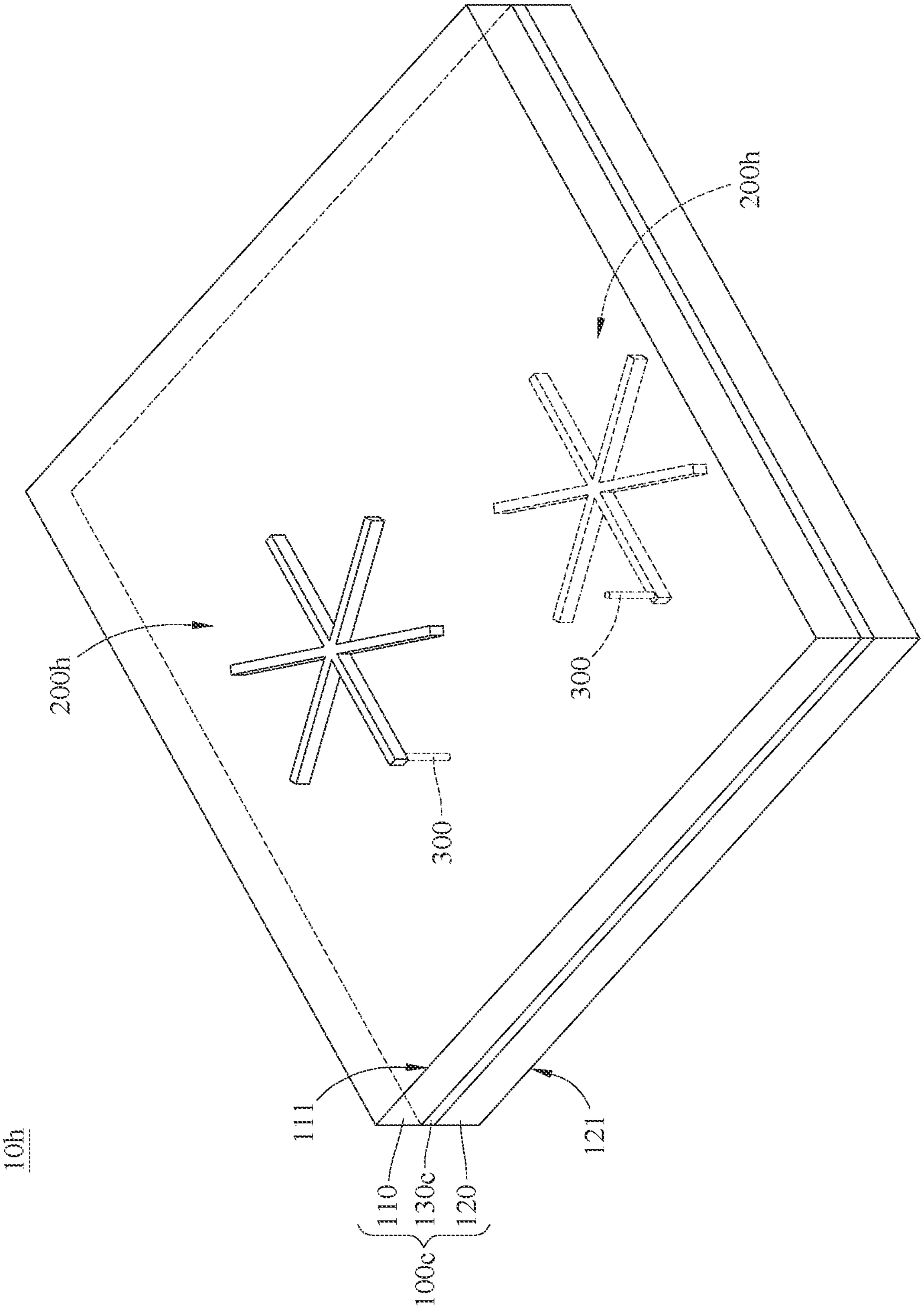
FIG. 18 is a schematic perspective view of a multi-layered resonator circuit structure according to a ninth embodiment of the disclosure.
Figure 19:
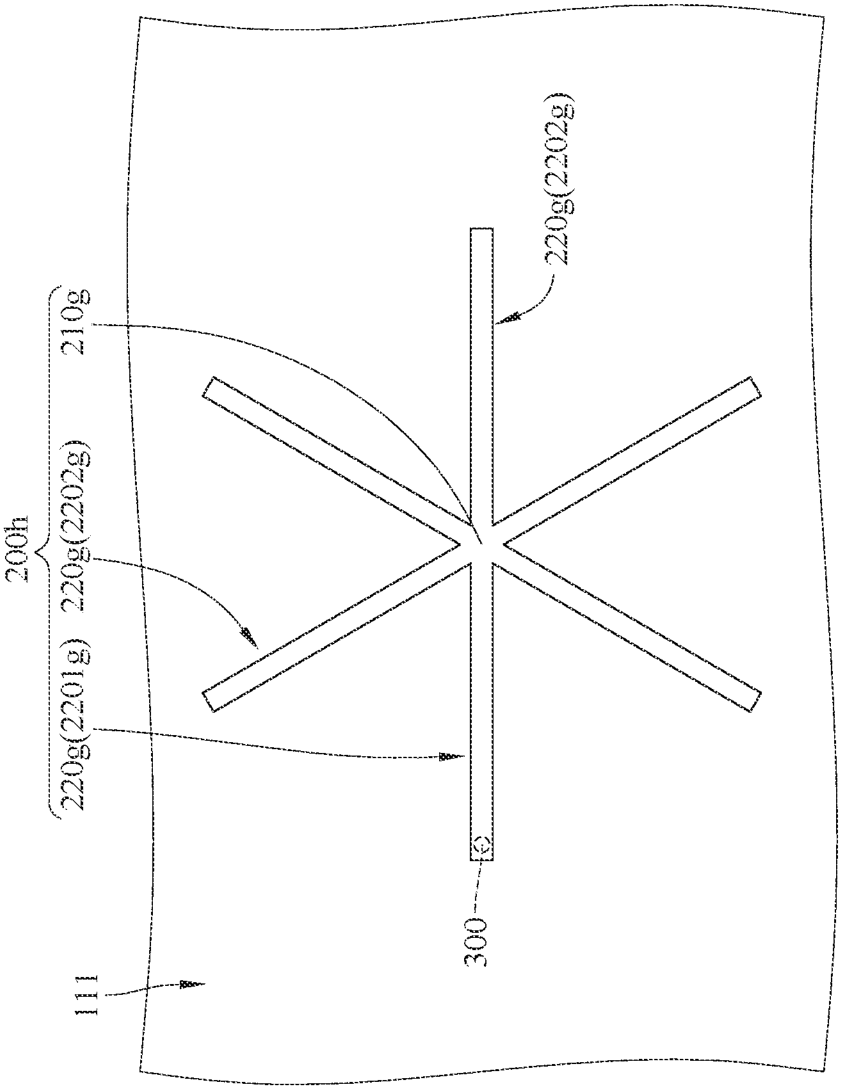
FIG. 19 is a top view of the multi-layered resonator circuit structure in FIG. 18.

Please refer to FIGS. 18 and 19. FIG. 18 is a schematic perspective view of a multi-layered resonator circuit structure 10*h* according to a ninth embodiment of the disclosure. FIG. 19 is a top view of the multi-layered resonator circuit structure 10*h* in FIG. 18. The multi-layered resonator circuit structure 10*h* according to the ninth embodiment of the disclosure includes a multi-layered substrate 100*c*, a plurality of resonators 200*h*, and a plurality of conductive components 300. The multi-layered resonator circuit structure 10*h* of this embodiment is similar to the multi-layered resonator circuit structure 10*g* of the eight embodiment, and the only difference therebetween is the quantity of open stubs 2202*g* included in each resonator 200*h*. In this embodiment, each resonator 200*h* includes five open stubs 2202*g* that are in a straight shape.

Figure 20:
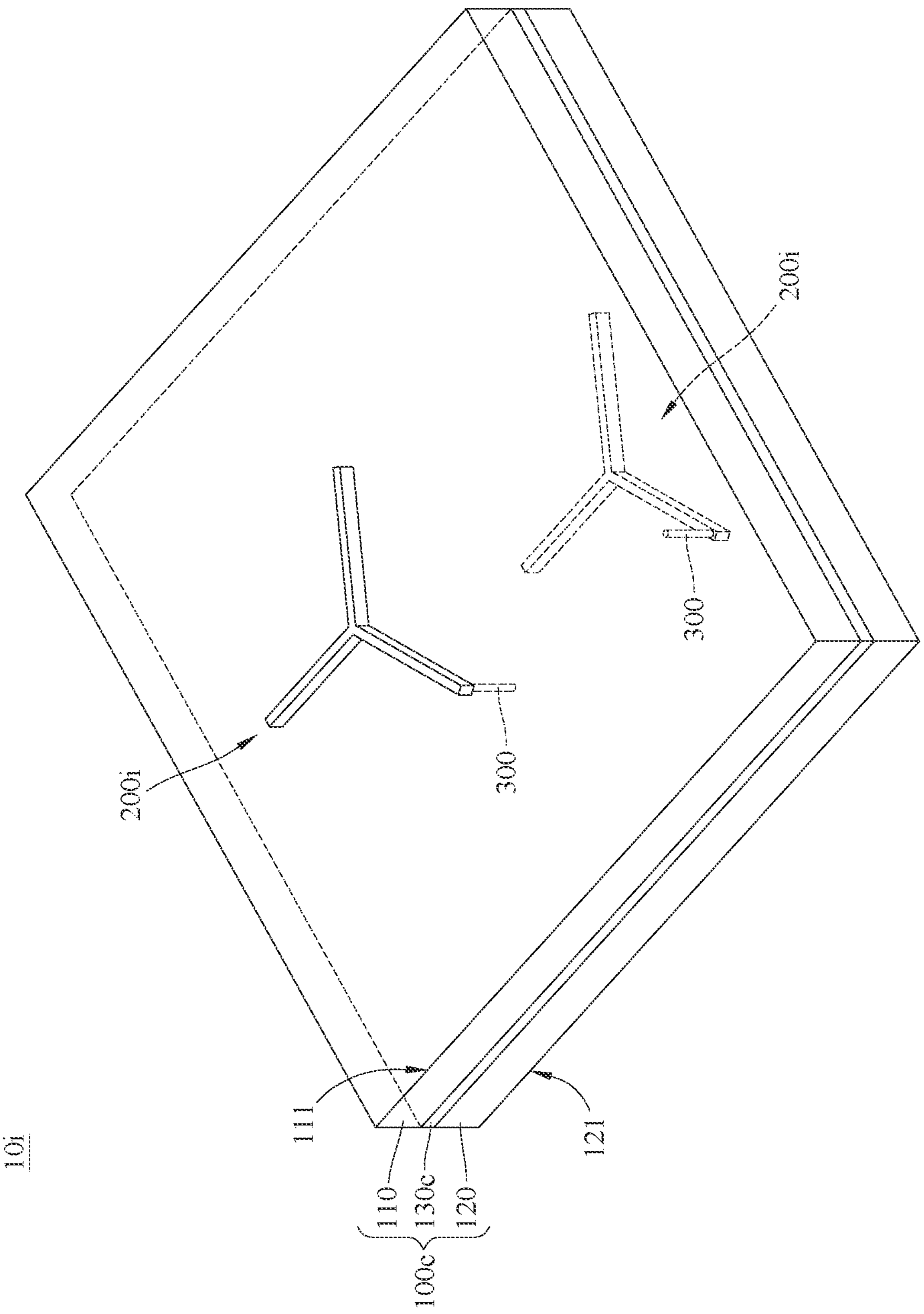
FIG. 20 is a schematic perspective view of a multi-layered resonator circuit structure according to a tenth embodiment of the disclosure.
Figure 21:
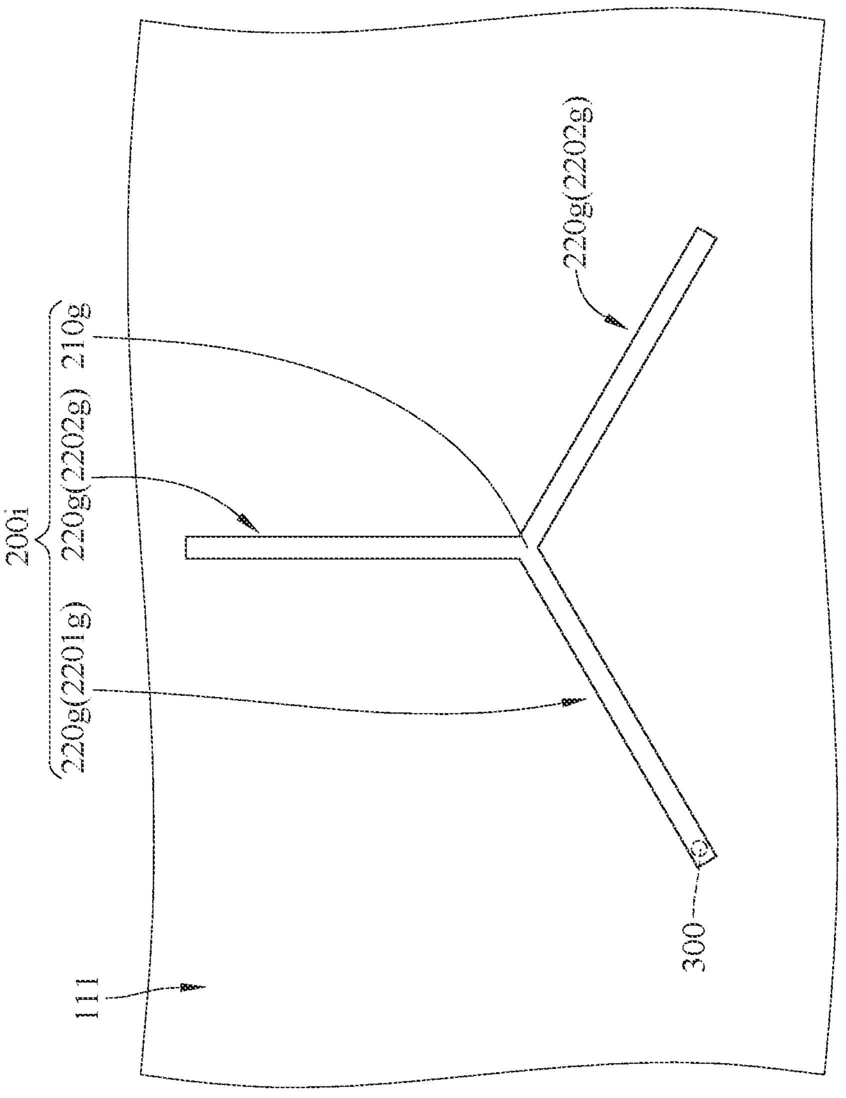
FIG. 21 is a top view of the multi-layered resonator circuit structure in FIG. 20.

Please refer to FIGS. 20 and 21. FIG. 20 is a schematic perspective view of a multi-layered resonator circuit structure 10*i* according to a tenth embodiment of the disclosure. FIG. 21 is a top view of the multi-layered resonator circuit structure 10*i* in FIG. 20. The multi-layered resonator circuit structure 10*i* according to the tenth embodiment of the disclosure includes a multi-layered substrate 100*c*, a plurality of resonators 200*i*, and a plurality of conductive components 300. The multi-layered resonator circuit structure 10*i* of this embodiment is similar to the multi-layered resonator circuit structure 10*g* of the eighth embodiment, and the only difference therebetween is the quantity of open stubs 2202*g* included in each resonator 200*i*. In this embodiment, each resonator 200*i* includes two open stubs 2202*g* that are in a straight shape.

Figure 22:
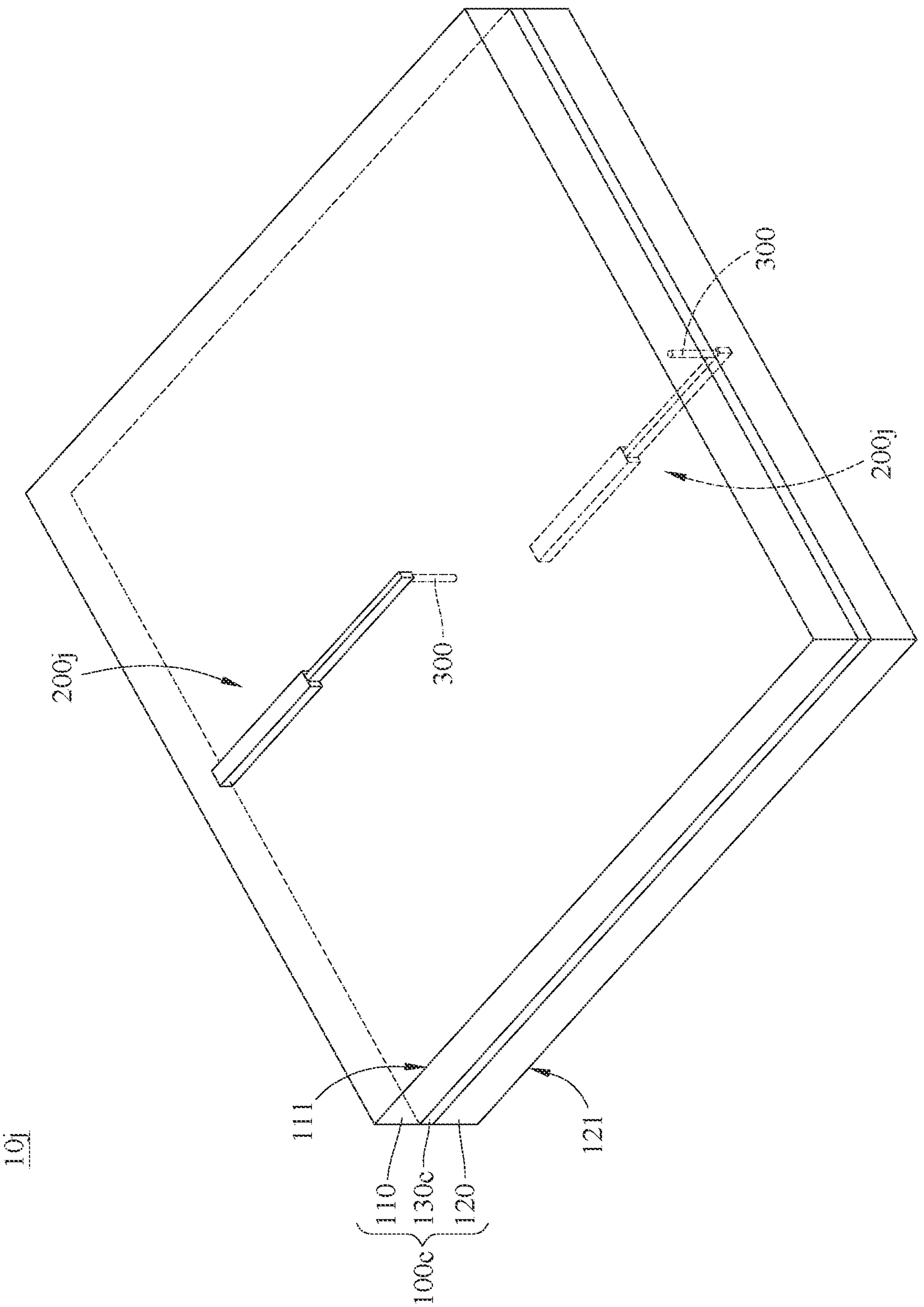
FIG. 22 is a schematic perspective view of a multi-layered resonator circuit structure according to an eleventh embodiment of the disclosure.
Figure 23:
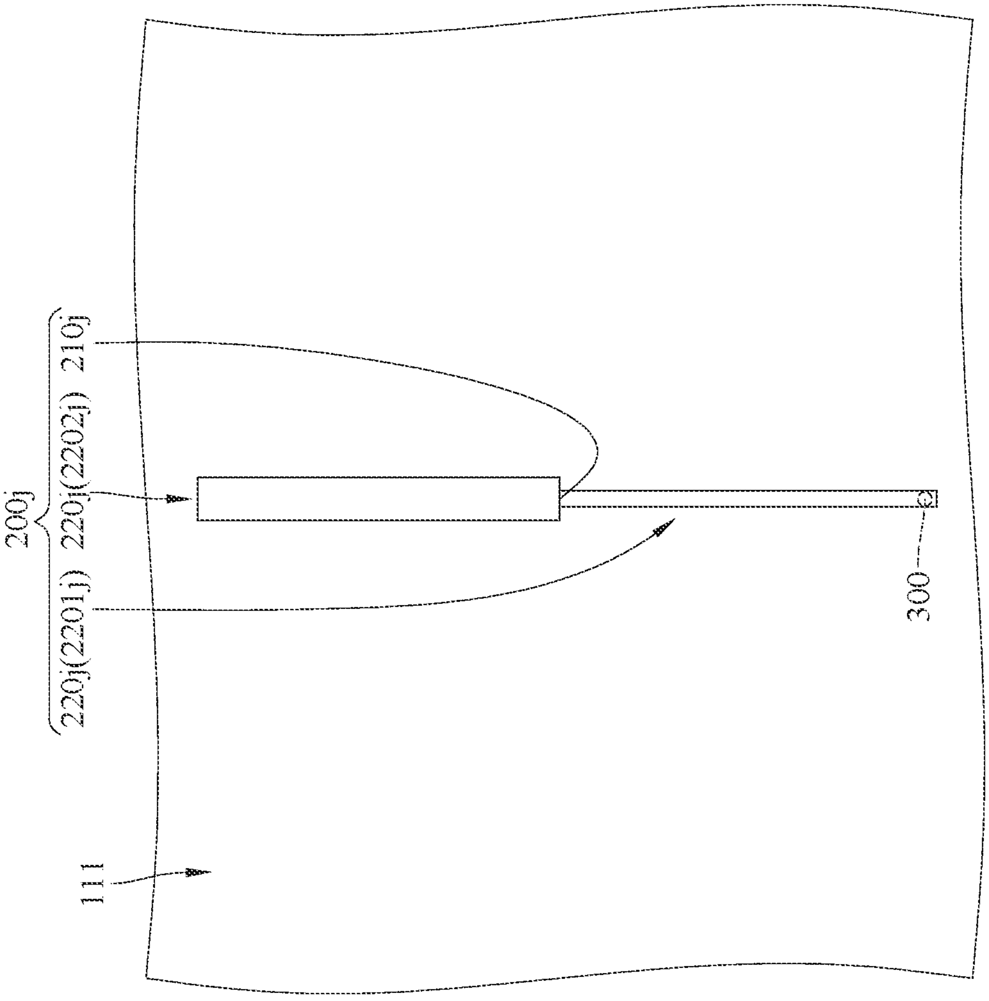
FIG. 23 is a top view of the multi-layered resonator circuit structure in FIG. 22.

Please refer to FIGS. 22 and 23. FIG. 22 is a schematic perspective view of a multi-layered resonator circuit structure 10*j* according to an eleventh embodiment of the disclosure. FIG. 23 is a top view of the multi-layered resonator circuit structure 10*j* in FIG. 22. The multi-layered resonator circuit structure 10*j* according to the eleventh embodiment of the disclosure includes a multi-layered substrate 100*c*, a plurality of resonators 200*j*, and a plurality of conductive components 300. The multi-layered resonator circuit structure 10*j* of this embodiment is similar to the multi-layered resonator circuit structure 10*g* of the eighth embodiment, and only difference therebetween will be described in detail below. In this embodiment, each resonator 200*j* includes one open stub 2202*j*. That is, each resonator 200*j* includes a joint 210*j* and two stubs 220*j*. The two stubs 220*j* are connected to the joint 210*j*, and are in a straight shape. The stubs 220*j* are, for example, one ground stub 2201*j* and one open stub 2202*j*.

Figure 24:
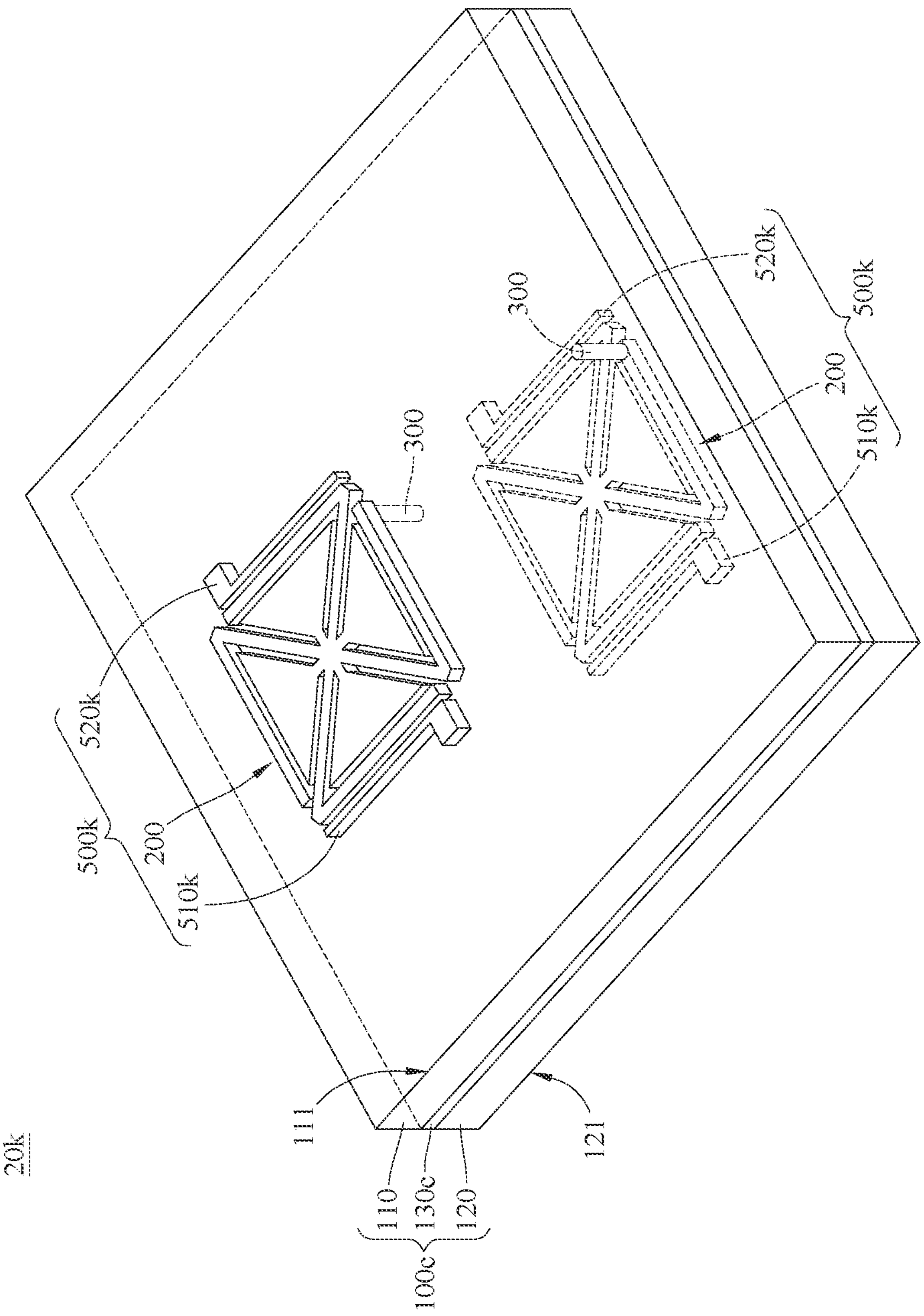
FIG. 24 is a schematic perspective view of a multi-layered filter circuit structure according to a twelfth embodiment of the disclosure.
Figure 25:
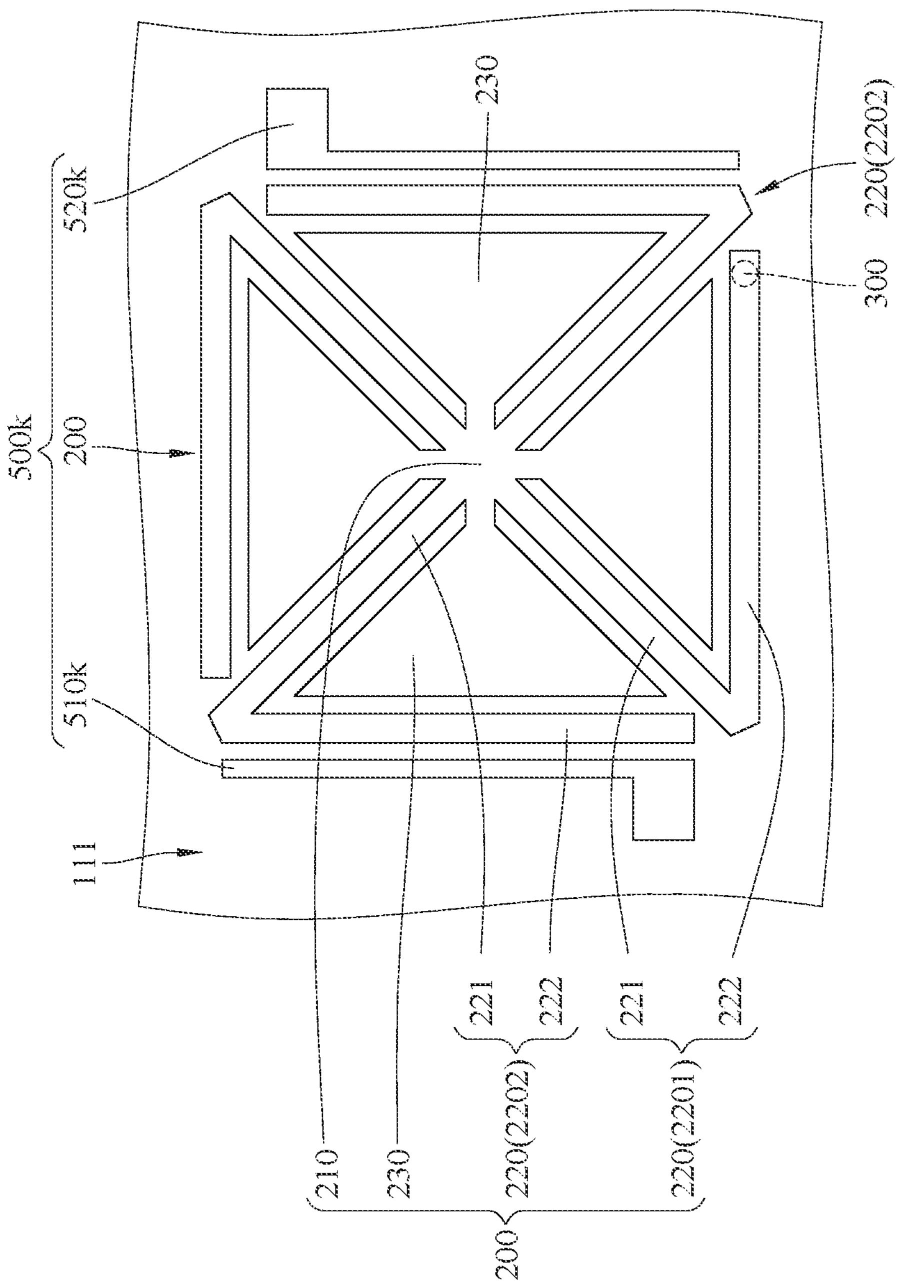
FIG. 25 is a top view of the multi-layered filter circuit structure in FIG. 24.

Please refer to FIGS. 24 and 25. FIG. 24 is a schematic perspective view of a multi-layered filter circuit structure 20*k* according to a twelfth embodiment of the disclosure. FIG. is a top view of the multi-layered filter circuit structure 20*k* in FIG. 24. The multi-layered filter circuit structure 20*k* includes a multi-layered substrate 100*c*, a plurality of filters 500*k*, and a plurality of conductive components 300.

The multi-layered substrate 100*c* has a top surface 111, a bottom surface 121 and a ground layer 130*c*. The top surface 111 and the bottom surface 121 face away from each other, and the ground layer 130*c* is located between the top surface 111 and the bottom surface 121. In this embodiment, the multi-layered substrate 100*c* is, for example, a two-layered substrate or a two-layered circuit board. In detail, in this embodiment, the multi-layered substrate 100*c* includes a first dielectric layer 110, and a second dielectric layer 120. The top surface 111 and the bottom surface 121 are located on the first dielectric layer 110 and the second dielectric layer 120, respectively. In addition, the multi-layered substrate 100 further includes a ground layer 130*c*. The first dielectric layer 110 and the second dielectric layer 120 are located on two opposite sides of the ground layer 130*c*, respectively. The top surface 111 and the bottom surface 121 face away from the ground layer 130*c*.

A part of the filters 500*k* is/are disposed on the top surface 111, and the remaining part of the filters 500*k* is/are disposed on the bottom surface 121. The filters 500*k* are the same or similar in structure, and thus only one of the filters 500*k* will be described in detail hereinafter. The filter 500*k* includes a resonator 200, an input port 510*k* and an output port 520*k*. The resonator 200 includes a joint 210 and a plurality of stubs 220. The stubs 220 are connected to the joint 210. The stubs 220 are, for example, one ground stub 2201 and three open stubs 2202; that is, in the resonator 200, there are one ground stub 2201 and three open stubs 2202 connected to the joint 210.

Note that in this embodiment, a quantity of the filters 500*k* disposed on the top surface 111 is equal to a quantity of the filters 500*k* disposed on the bottom surface 121, but the disclosure is not limited thereto. In other embodiments, the quantity of the filters disposed on the top surface may be different from the quantity of the filters disposed on the bottom surface.

The input port 510*k* and the output port 520*k* are located on two opposite sides of the resonator 200, respectively. Also, the input port 510*k* and one stub 220 located on a side of the resonator 200 are arranged side by side. The output port 520*k* and another stub 220 located on the opposite side of the resonator 200 are arranged side by side. With such configuration, one or more signals can be input into the input port 510*k* and then output from the output port 520*k* via the resonator 200, thereby performing a function of filtering.

Figure 26:
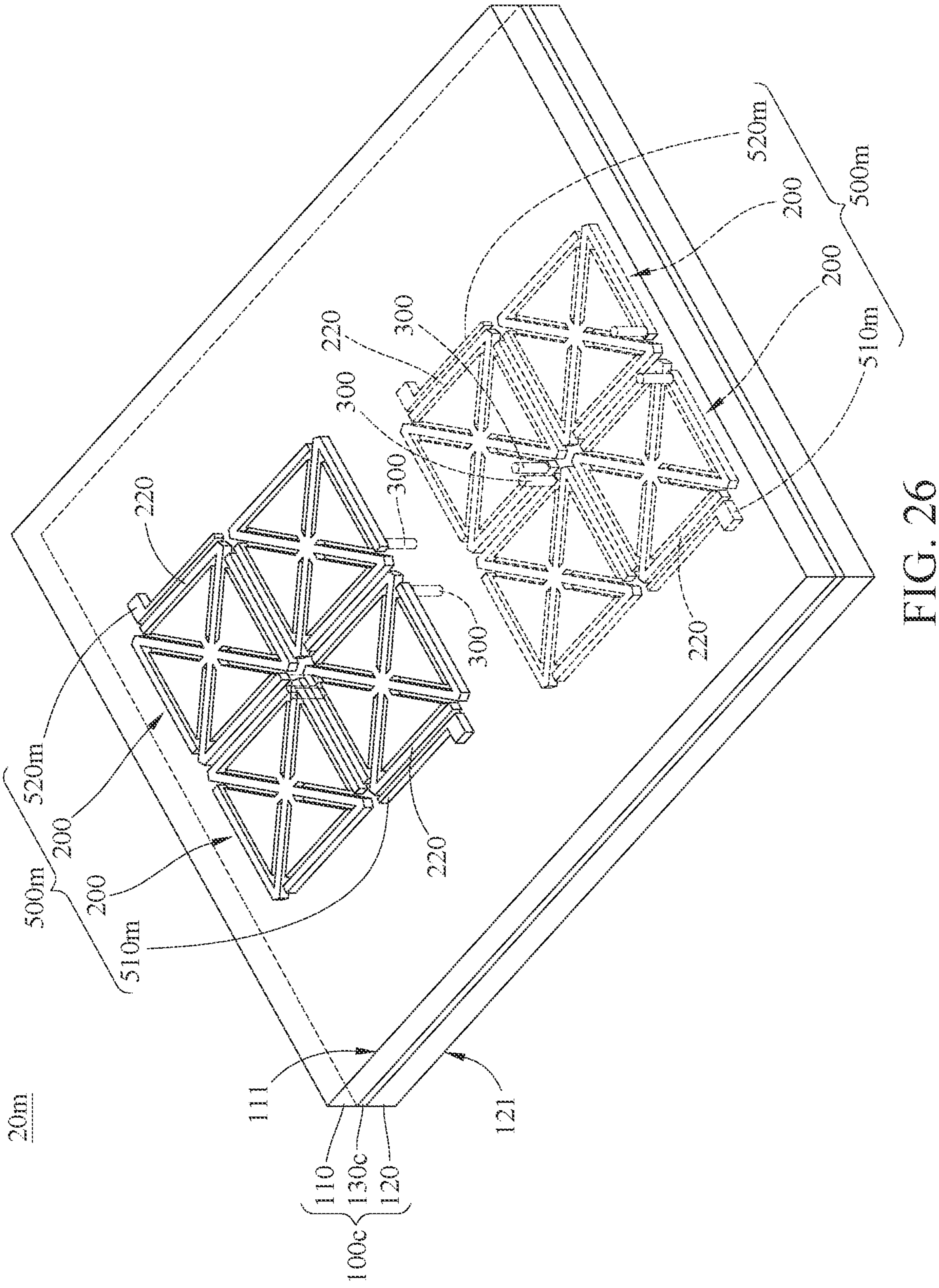
FIG. 26 is a schematic perspective view of a multi-layered filter circuit structure according to a thirteenth embodiment of the disclosure.
Figure 27:
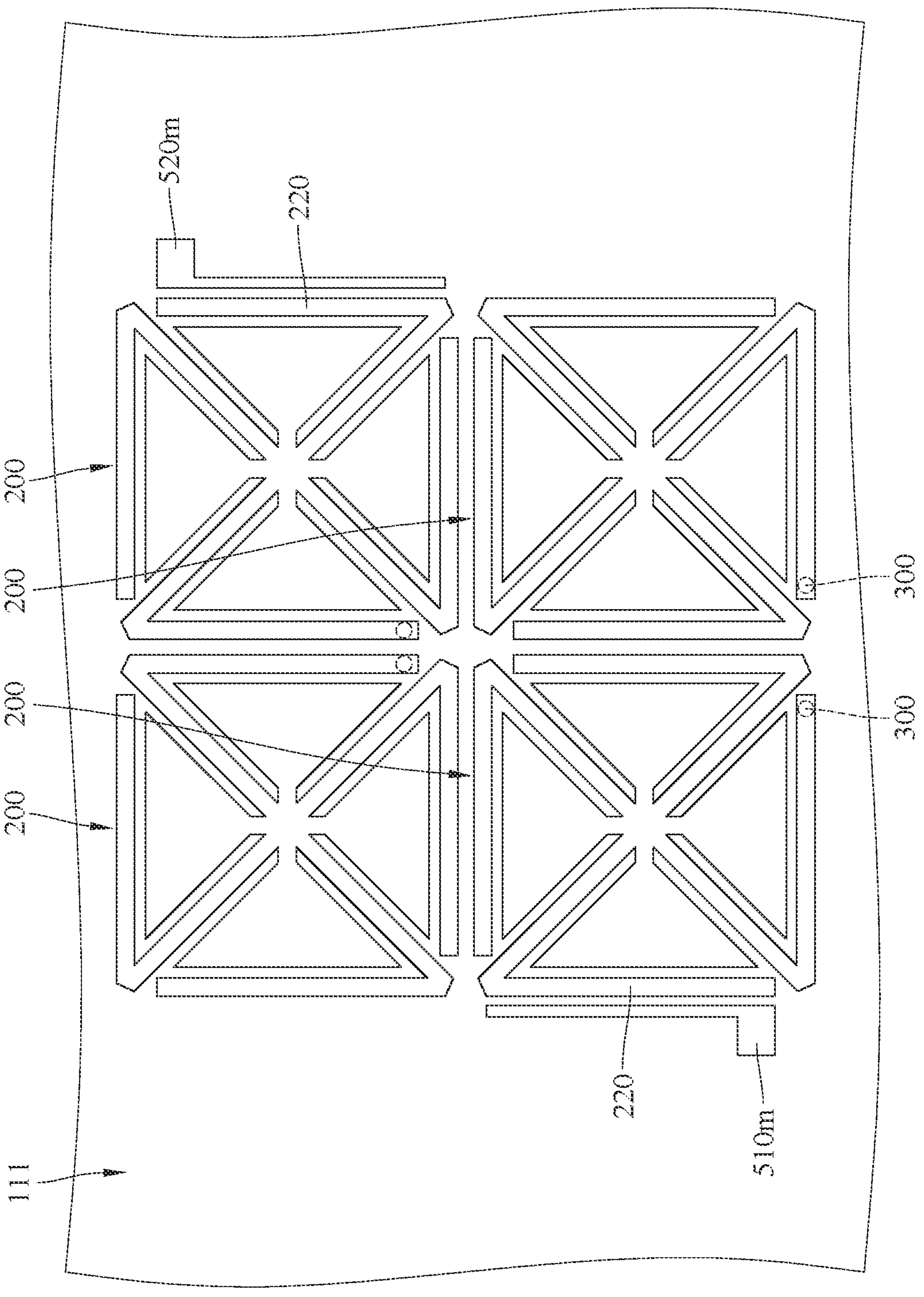
FIG. 27 is a top view of the multi-layered filter circuit structure in FIG. 26.

Please refer to FIGS. 26 and 27. FIG. 26 is a schematic perspective view of a multi-layered filter circuit structure 20*m* according to a thirteenth embodiment of the disclosure. FIG. 27 is a top view of the multi-layered filter circuit structure 20*m* in FIG. 26. The multi-layered filter circuit structure 20*m* according to the thirteenth embodiment of the disclosure includes a multi-layered substrate 100*c*, a plurality of filters 500*m*, and a plurality of conductive components 300. The multi-layered filter circuit structure 20*m* of this embodiment is similar to the multi-layered filter circuit structure 20*k* of the twelfth embodiment, and only difference therebetween will be described in detail below. In this embodiment, as shown in FIGS. 26 and 27, the filters 500*m* disposed on the top surface 111 includes a plurality of resonators 200, the filters 500*m* disposed on the bottom surface 121 includes a plurality of resonators 200, and the corresponding resonators 200 are in alignment with multiple straight lines. For example, four resonators 200 are located on the top surface 111, and are arranged in a 2×2 array. That is, on the top surface 111 or the bottom surface 121, the same amount of the resonators 200 are in alignment with different straight lines. The input port 510*m* and the output port 520*m* are located on two opposite sides of the array of the resonators 200. In other words, the input port 510*m* and one of the stubs 220 located on a side of the array of the resonators 200 are arranged side by side, and the output port 520*m* and another one or the stubs 220 located on the opposite side of the array of the resonator 200 are arranged side by side.

Figure 28:
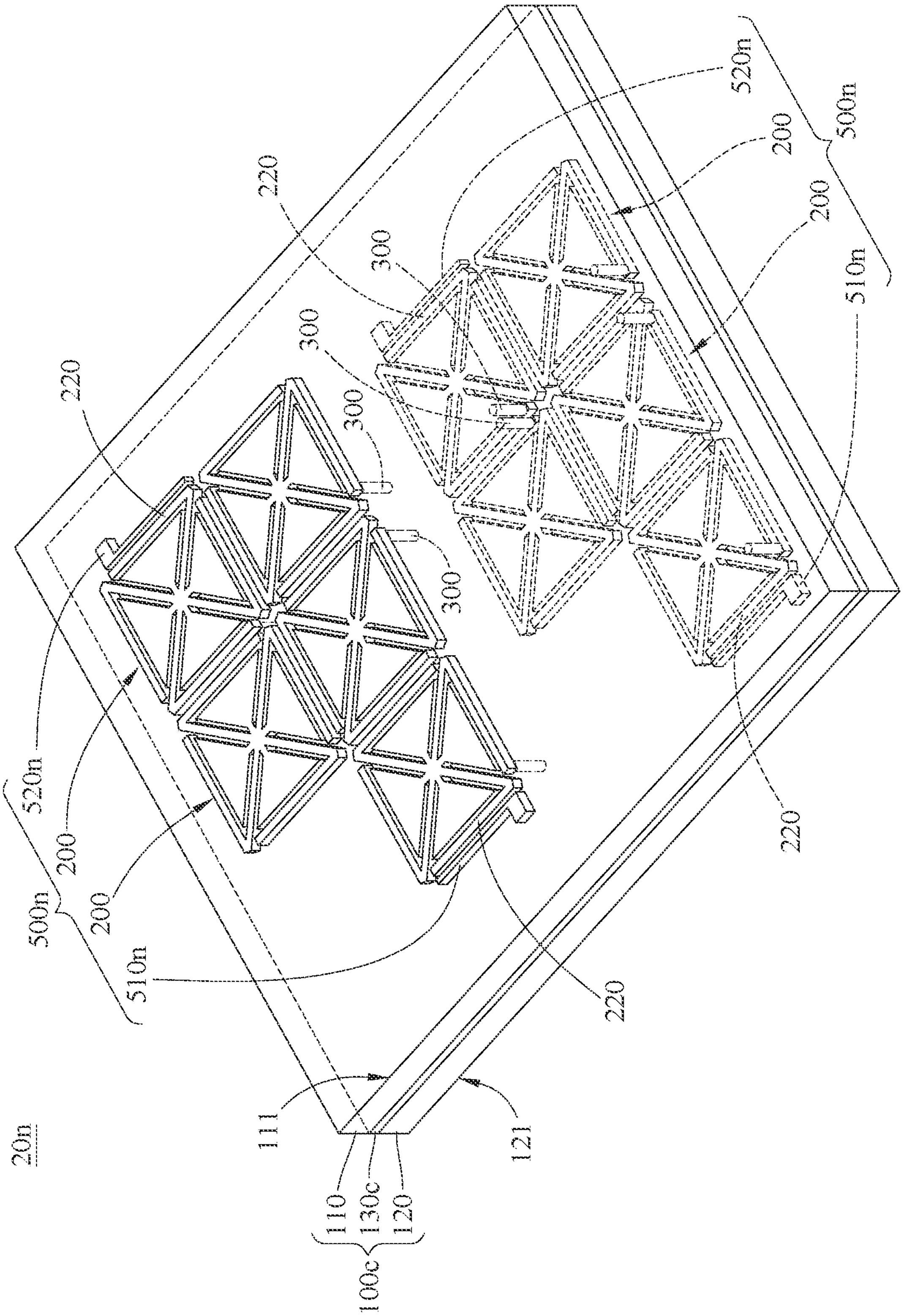
FIG. 28 is a schematic perspective view of a multi-layered filter circuit structure according to a fourteenth embodiment of the disclosure.
Figure 29:
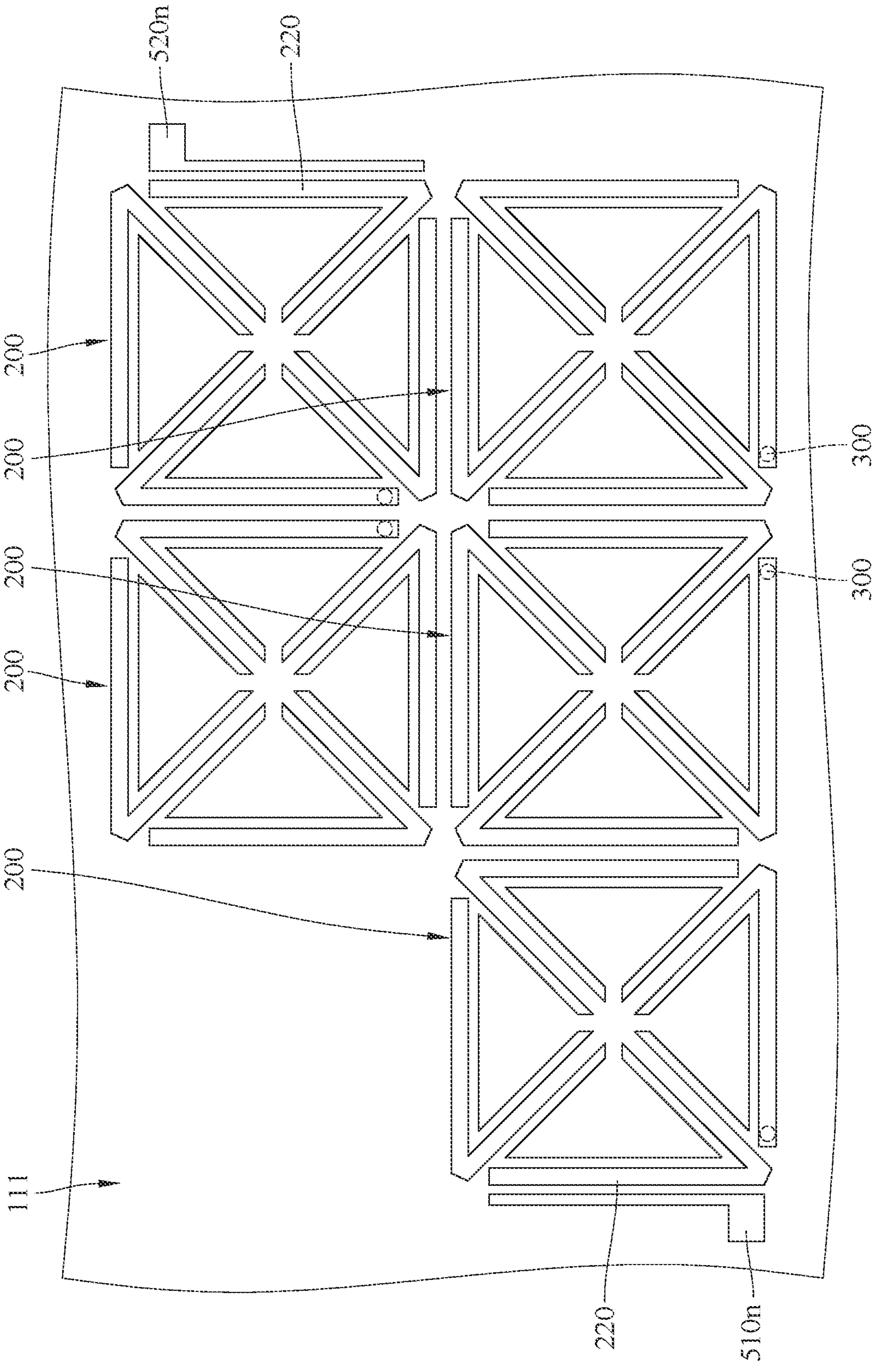
FIG. 29 is a top view of the multi-layered filter circuit structure in FIG. 28.

Please refer to FIGS. 28 and 29. FIG. 28 is a schematic perspective view of a multi-layered filter circuit structure 20*n* according to a fourteenth embodiment of the disclosure. FIG. 29 is a top view of the multi-layered filter circuit structure 20*n* in FIG. 28. The multi-layered filter circuit structure 20*n* according to the fourteenth embodiment of the disclosure includes a multi-layered substrate 100*c*, a plurality of filters 500*n*, and a plurality of conductive components 300. The multi-layered filter circuit structure 20*n* of this embodiment is similar to the multi-layered filter circuit structure 20*k* of the twelfth embodiment, and only difference therebetween will be described in detail below. In this embodiment, as shown in FIGS. 28 and 29, the filter 500*n* disposed on the top surface 111 includes a plurality of resonators 200, the filter 500*n* disposed on the bottom surface 121 includes a plurality of resonators 200, and the corresponding resonators 200 are in alignment with multiple straight lines. For example, five resonators 200 are disposed on the top surface 111, and the resonators 200 disposed on the top surface 111 are in alignment with two straight lines. For example, two resonators 200 are in alignment with a first straight line, and the other three resonators 200 are in alignment with a second straight line. That is, on the top surface 111 or the bottom surface 121, different amount of the resonators 200 are in alignment with different straight lines. The input port 510*n* and the output port 520*n* are located on two opposite sides of the set of the resonators 200, respectively. In other words, the input port 510*n* and one of the stubs 220 located on a side of the set of the resonators 200 are arranged side by side, and the output port 520*n* and another one of the stubs 220 located on the opposite side of the set of the resonator 200 are arranged side by side.

According to the multi-layered resonator circuit structure and the multi-layered filter circuit structure disclosed by the above embodiments, the resonators or the filters are disposed on the top surface and the bottom surface of the multi-layered substrate facing away from each other; in other words, at least one of the resonators or the filters is not disposed on the top surface of the multi-layered substrate. Accordingly, by moving at least one of the resonators or the filters from the top surface to the bottom surface, more spare space on the top surface is available for other electronic components besides the resonators, thereby improving the space utilization of the circuit board (i.e., multi-layered substrate) and facilitating the miniaturization of the circuit board.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A multi-layered resonator circuit structure, comprising:

a multi-layered substrate having a top surface, a bottom surface, and a ground layer, wherein the top surface and the bottom surface face away from each other, and the ground layer is located between the top surface and the bottom surface;

a plurality of resonators, a part of the plurality of resonators disposed on the top surface, and another part of the plurality of resonators disposed on the bottom surface; and a plurality of conductive components located in the multi-layered substrate and wherein the plurality of resonators is electrically connected to the ground layer, respectively, via the plurality of conductive components;

wherein each of the plurality of resonators includes a joint and a plurality of stubs, the plurality of stubs are connected to the joint, the plurality of stubs are one ground stub and at least one open stub, and the plurality of ground stubs are electrically connected to the ground layer, respectively, via the plurality of conductive components;

wherein the at least one open stub comprises a plurality of open stubs;

wherein the plurality of open stubs protrude from the ground stub along different directions.

2. The multi-layered resonator circuit structure according to claim 1, wherein each of the plurality of stubs comprises an inner extension portion and an outer extension portion, the inner extension portion is connected to a corresponding one of the joints, the outer extension portion is connected to the inner extension portion, and the outer extension portion is non-parallel to the inner extension portion.

3. The multi-layered resonator circuit structure according to claim 2, wherein the inner extension portion and the outer extension portion of one of the plurality of stubs and the inner extension portion of another one of the plurality of stubs which is located adjacent thereto together form an arrangement area therebetween, each of the plurality of resonators further comprises a plurality of leaves connected to a corresponding one of the joints and located in the plurality of arrangement areas, respectively.

4. The multi-layered resonator circuit structure according to claim 3, wherein two of the plurality of resonators are disposed on the top surface and are coupled to each other via two of the plurality of stubs arranged side by side on the top surface, another two of the plurality of resonators are disposed on the bottom surface and are coupled to each other via another two of the plurality of stubs arranged side by side on the bottom surface, the ground layer has two opening slots spaced apart from each other, one of the two opening slots corresponds to the two of the plurality of stubs coupled to each other on the top surface, and another one of the two opening slots corresponds to the another two of the plurality of stubs coupled to each other on the bottom surface.

5. The multi-layered resonator circuit structure according to claim 4, wherein an orthogonal projection of each of the two opening slots onto the top surface or the bottom surface is located between two of the joints, and perpendicular to the two outer extension portions of the two stubs coupled to each other.

6. The multi-layered resonator circuit structure according to claim 4, wherein each of the two opening slots comprises a main slot portion and two secondary slot portions, an orthogonal projection of the main slot portion onto the top surface or the bottom surface is located between two of the joints and perpendicular to the two outer extension portions of the two stubs coupled to each other, and the two secondary slot portions are perpendicular to the main slot portion and connected to two opposite ends of the main slot portion, respectively.

7. The multi-layered resonator circuit structure according to claim 6, wherein each of the two opening slots further comprises a plurality of tertiary slot portions parallel to the main slot portion and connected two opposite ends of the two secondary slot portions, respectively.

8. A multi-layered filter circuit structure, comprising:

a multi-layered substrate having a top surface, a bottom surface, and a ground layer, wherein the top surface and the bottom surface face away from each other, and the ground layer is located between the top surface and the bottom surface;

a plurality of filters, a part of the plurality of filters disposed on the top surface, and another part of the plurality of filters disposed on the bottom surface; and a plurality of conductive components located in the multi-layered substrate and wherein the plurality of filters is electrically connected to the ground layer, respectively, via the plurality of conductive components;

wherein each of the plurality of filters comprises at least one resonator, an input port and an output port, the input port and the output port are spaced apart from the at least one resonator and located on two opposite sides of the at least one resonator, respectively, and the plurality of resonators are electrically connected to the ground layer, respectively, via the plurality of conductive components;

wherein the at least one resonator is located between the input port and the output port.

9. The multi-layered filter circuit structure according to claim 8, wherein a plurality of resonators are disposed on the top surface and in alignment with a plurality of straight lines, and a plurality of resonators are disposed on the bottom surface and in alignment with a plurality of straight lines.

10. The multi-layered filter circuit structure according to claim 9, wherein on the top surface or the bottom surface, identical amount of the plurality of resonators are in alignment with different ones of the plurality of straight lines.

11. The multi-layered filter circuit structure according to claim 9, wherein on the top surface or the bottom surface, different amounts of the plurality of resonators are in alignment with at least two of the plurality of straight lines.

* * * * *